US011917463B2

(12) United States Patent
Chen

(10) Patent No.: US 11,917,463 B2
(45) Date of Patent: Feb. 27, 2024

(54) CELL HANDOVER WITH MINIMUM MOBILITY INTERRUPTION

(71) Applicant: FG Innovation Company Limited, Tuen Mun (HK)

(72) Inventor: Hung-Chen Chen, Taipei (TW)

(73) Assignee: TOGAIL TECHNOLOGIES, LTD., Dublin (IE)

( * ) Notice: Subject to any disclaimer, the term of this patent is extended or adjusted under 35 U.S.C. 154(b) by 0 days.

(21) Appl. No.: 17/344,174

(22) Filed: Jun. 10, 2021

(65) Prior Publication Data

US 2021/0306917 A1 Sep. 30, 2021

Related U.S. Application Data

(63) Continuation of application No. 16/449,947, filed on Jun. 24, 2019, now Pat. No. 11,071,025.

(Continued)

(51) Int. Cl.
*H04W 36/00* (2009.01)
*H04W 36/18* (2009.01)
(Continued)

(52) U.S. Cl.
CPC ... *H04W 36/0069* (2018.08); *H04W 36/0061* (2013.01); *H04W 36/0085* (2018.08);
(Continued)

(58) Field of Classification Search
CPC ......... H04W 36/0069; H04W 36/0061; H04W 72/048; H04W 36/0085; H04W 48/16; H04W 36/18; H04W 12/001
See application file for complete search history.

(56) References Cited

U.S. PATENT DOCUMENTS 9,699,702 B2 * 7/2017 Fujishiro ............... H04W 36/06
10,212,637 B2 * 2/2019 Jung ..................... H04W 36/04
(Continued)

FOREIGN PATENT DOCUMENTS

CN  104219722 A  12/2014
CN  104219722 B  7/2019
(Continued)

OTHER PUBLICATIONS

European Search Report for EP3815427 dated Jun. 1, 2022 (13 pages).

(Continued)

*Primary Examiner* — Mohamed A Kamara
(74) *Attorney, Agent, or Firm* — Antonio Papageorgiou; Lombard & Geliebter LLP

(57) ABSTRACT

Some of the present implementations provide a method for a user equipment (UE) for performing a handover procedure with minimum mobility interruption. The method receives, at the UE, a reconfiguration message that has an indicator for performing a dual-connectivity based (DC-based) handover procedure. The method then performs the DC-based handover procedure without reestablishing a packet data convergence protocol (PDCP) entity of the UE during the DC-based handover procedure. The PDCP entity maintains a plurality of security keys to decipher PDCP packets received from at least one of a source base station and a target base station during the handover procedure and while the UE is transitioning from the source base station to the target base station.

17 Claims, 9 Drawing Sheets

Related U.S. Application Data

(60) Provisional application No. 62/692,077, filed on Jun. 29, 2018.

(51) Int. Cl.
*H04W 48/16* (2009.01)
*H04W 72/04* (2009.01)
*H04W 72/51* (2023.01)

(52) U.S. Cl.
CPC .......... *H04W 36/18* (2013.01); *H04W 48/16* (2013.01); *H04W 72/51* (2023.01)

(56) References Cited

U.S. PATENT DOCUMENTS

| | | |
|---|---|---|
| 2015/0223212 A1 | 8/2015 | Van Der Velde |
| 2015/0264562 A1 | 9/2015 | Wu |
| 2015/0264621 A1* | 9/2015 | Sivanesan ......... H04W 36/0069 455/436 |
| 2015/0271726 A1* | 9/2015 | Kim .................. H04W 76/15 370/329 |
| 2016/0249210 A1 | 8/2016 | Chang |
| 2016/0255675 A1* | 9/2016 | Van Lieshout ....... H04L 1/1867 370/329 |
| 2017/0127331 A1 | 5/2017 | Wu |
| 2017/0374705 A1 | 12/2017 | Mitsui |
| 2018/0324651 A1* | 11/2018 | Tenny .............. H04W 36/0016 |
| 2019/0159274 A1 | 5/2019 | Hong |
| 2020/0107189 A1* | 4/2020 | Sharma .............. H04W 36/02 |
| 2020/0107390 A1 | 4/2020 | Hwang |
| 2022/0159773 A1* | 5/2022 | Ingale ............... H04W 76/16 |

FOREIGN PATENT DOCUMENTS

| | | |
|---|---|---|
| EP | 3815427 | 5/2021 |
| WO | 2018142308 | 8/2018 |
| WO | 2020001615 | 1/2020 |

OTHER PUBLICATIONS

Huawei et al SgNB to MgNB reconfiguration for 0ms interruption handover vol. RAN WG2 No. Qingdao China Jun. 27, 2017 Jun. 29, 2017 Jun. 26, 2017 3GPP Draft R21706709 SGNB to MGNB Reconfiguration for 0MS Interruption Handover 3rd Generation Partnership Project 3GPP Mobile Competence Centre 650 Route Des Lucioles F06921 Sophiaantipo; retrived from https://www.3gpp.org/ftp/Meetings_3GPP_SYNC/RAN2/Docs/ (5 pages).

Huawei et al Security key change without L2 reset vol. RAN WG2 No. Qingdao China Jun. 27, 2017 Jun. 29, 2017 Jun. 26, 2017 3GPP Draft R21706713 Security Key Change Without L2 Reset 3rd Generation Partnership Project 3GPP Mobile Competence Centre 650 Route Des Lucioles F06921 Sophiaantipolis Cedex France; retrieved from https://www.3gpp.org/ftp/Meetings_3GPP_SYNC/RAN2/Docs/ (3 pages).

Huawei et al Comparison of 0ms interruption solutions vol. Ran WG2 No. Qingdao China Jun. 27, 2017 Jun. 29, 2017 Jun. 26, 2017 3GPP Draft R21706707 Comparison of 0MS Interruption Solutions 3rd Generation Partnership Project 3GPP Mobile Competence Centre 650 Route Des Lucioles F06921 Sophiaantipolis Cedex France; retrieved from https://www.3gpp.org/ftp/Meetings_3GPP_SYNC/RAN2/Docs/.

European Communication with Partial Supplementary Search Report for EP3815427 dated Feb. 24, 2022 (13 bages).

PCT International Search Report and Written Opinion for International Application No. PCT/CN2019/093681, dated Sep. 27, 2019 (7 pages).

* cited by examiner

CELL HANDOVER WITH MINIMUM MOBILITY INTERRUPTION

CROSS-REFERENCE TO RELATED APPLICATION(S)

This application is a continuation application of U.S. patent application Ser. No. 16/449,947, filed on Jun. 24, 2019, which claims the benefit of and priority to a provisional U.S. Patent Application Ser. No. 62/692,077, filed on Jun. 29, 2018, the contents of all of which are fully incorporated herein by reference for all purposes.

FIELD

The present disclosure generally relates to wireless communications, and more particularly, to cell handover with minimum mobility interruption in the next generation wireless networks.

BACKGROUND

In a cellular handover, a connected cellular call and/or data session is transferred from one cell (or base station) to another without disconnecting the session. Cellular services allow a user equipment (UE) to be moved from one cell to another (e.g., based on the UE's movement), or to be switched to the best suitable cell (e.g., to enhance the UE's performance). A handover procedure is usually triggered by a measurement report received from the UE. For example, when the quality (e.g., signal strength and/or service quality) of a serving cell of the UE is below a (preconfigured) threshold and a neighboring cell's quality is above the threshold, the UE may send a measurement report to a source base station. The source base station may then send a handover request message to multiple candidate target cells. Subsequently, the source base station may select one of the candidate cells as the target cell and send a handover command to the UE to switch from the source cell to the target cell. The UE, however, may lose some of the data exchanged between the UE and the source and/or target cell, while the UE transitions from the source cell to the target cell. The shortest time duration supported by a wireless communication system during which a UE cannot exchange data (e.g., user plane packets) with any cell (e.g., the source and target cells) is known as the mobility interruption time. It is desirable to minimize the mobility interruption time (e.g., to sub-millisecond (ms) or near zero).

SUMMARY

The present disclosure is directed to cell handover with minimum mobility interruption in the next generation wireless networks.

In a first aspect of the present application, a method for performing a handover procedure with minimum mobility interruption is provided. The method comprises receiving, at the UE, a reconfiguration message having an indicator for performing a dual-connectivity based (DC-based) handover procedure; and performing the DC-based handover procedure without reestablishing a packet data convergence protocol (PDCP) entity of the UE during the DC-based handover procedure, wherein the PDCP entity maintains a plurality of security keys to decipher PDCP packets received from at least one of a source base station and a target base station while the UE is transitioning from the source base station to the target base station.

In an implementation of the first aspect, deciphering the PDCP packets comprises applying the first security key of the plurality of security keys maintained by the PDCP entity to a first subset of the PDCP packets that is received from the source base station and applying the second security key of the plurality of security keys to a second subset of the PDCP packets that is received from the target base station.

Another implementation of the first aspect, further comprises reporting a handover procedure failure to the source base station when the DC-based handover procedure is not performed successfully.

In yet another implementation of the first aspect, performing the DC-based handover procedure further comprises adding the target base station as a secondary node (SN) for the source base station that is acting as a master node (MN), and reconfiguring the SN to become a new MN.

Another implementation of the first aspect further comprises transitioning to a dual connectivity mode after receiving the reconfiguration message to receive the PDCP packets from at least one of the MN and the SN.

Another implementation of the first aspect further comprises, before receiving the reconfiguration message, the UE is in a dual connectivity mode with the source base station acting as a master node (MN) and the target base station acting as a secondary node (SN), and after receiving the reconfiguration message, reconfiguring the SN to become a new MN.

In another implementation of the first aspect, performing the DC-based handover procedure comprises relocating the PDCP entity from the source base station to the target base station instead of reestablishing the PDCP entity during the handover procedure.

In another implementation of the first aspect, the reconfiguration message includes configuration data for configuring the UE to establish signaling radio bearer type 1 (SRB1) and SRB2 with the target base station.

In another implementation of the first aspect, performing the DC-based handover procedure further comprises performing the DC-based handover procedure based on a change of bearer type for each radio bearer.

In another implementation of the first aspect performing the DC-based handover procedure comprises applying first and second security keys to the PDCP packets received, respectively, from the source and target base stations using additional network (NW) assistance information.

In another implementation of the first aspect, the NW assistance information comprises an end-marker PDCP control packet data unit (PDU), the end-marker indicating that the last PDCP packet that uses the first security key to be deciphered has been delivered.

Another implementation of the first aspect further comprises, before receiving the reconfiguration message having the indicator, sending out a message that indicates the UE's capability of performing the DC-based handover procedure.

In a second aspect of the present application, a UE is provided. The UE includes one or more non-transitory computer-readable media having computer-executable instructions for performing a handover procedure with minimum mobility interruption embodied thereon; and at least one processor coupled to the one or more non-transitory computer-readable media, and configured to execute the computer-executable instructions to: receive, at the UE, a reconfiguration message having an indicator for performing a dual-connectivity based (DC-based) handover procedure; and perform the DC-based handover procedure without reestablishing a packet data convergence protocol (PDCP) entity of the UE during the DC-based handover procedure, wherein the PDCP entity maintains a plurality of security keys to decipher PDCP packets received from at least one of a source base station and a target base station while the UE is transitioning from the source base station to the target base station.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
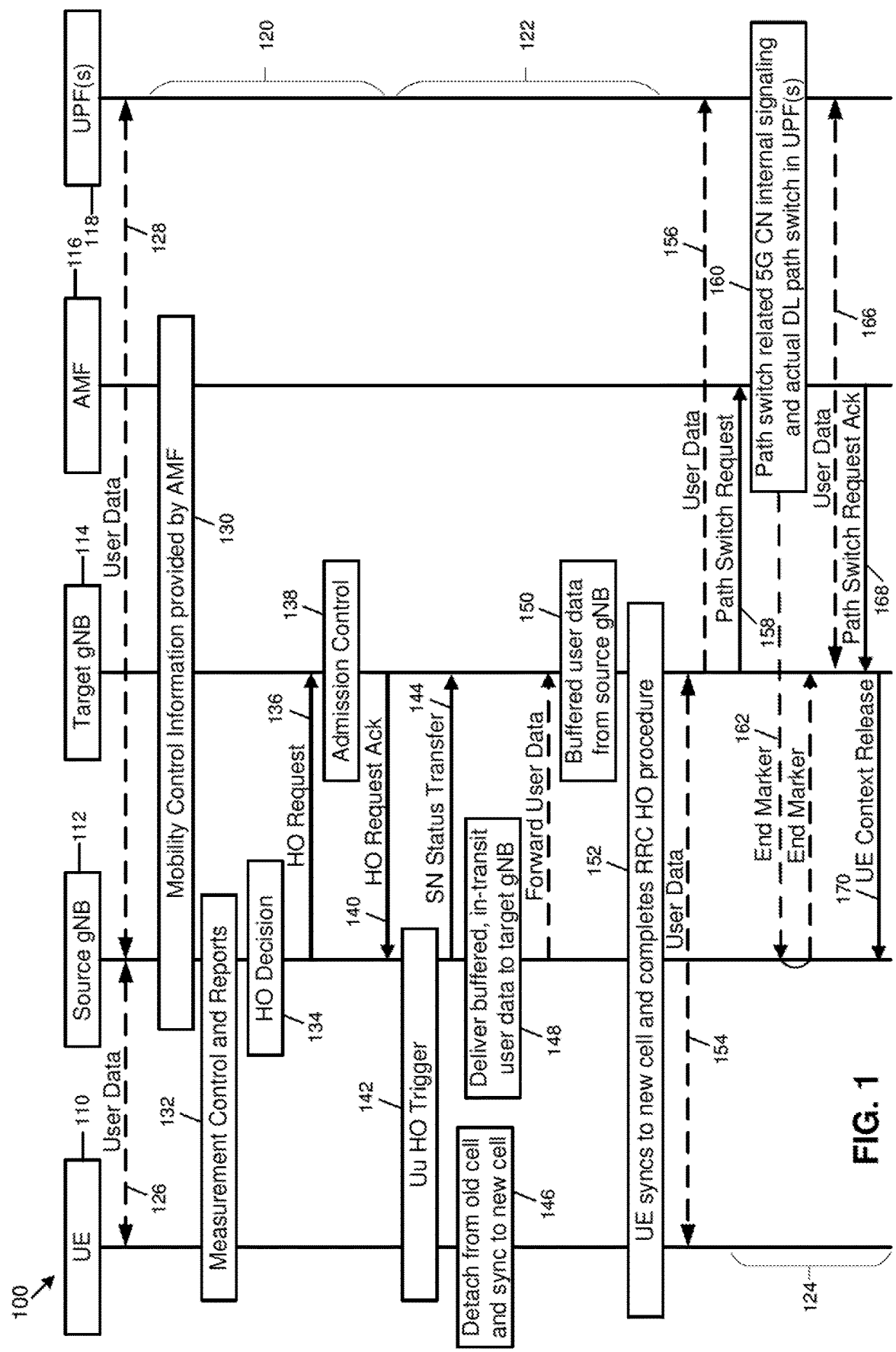
FIG. 1 is a diagram illustrating an intra-NR handover scenario in which the Access and Mobility Management Function (AMF) and User Plane Function (UPF) do not change, according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), a 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UNITS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UNITS (often referred to as 3G) based on basic Wideband-Code Division Multiple Access (W-CDMA), High-Speed Packet Access (HSPA), LTE, LTE-A, eLTE, NR, and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC (Multi-Radio Dual Connectivity) cases, the primary cell of an MCG or a primary secondary cell of an SCG may be called a special cell (SpCell). So, a PCell may refer to the SpCell of an MCG, while a PSCell may refer to the SpCell of an SCG. An MCG may include a group of serving cells associated with the MN, comprising of the SpCell and optionally one or more secondary cells (SCells). An SCG may include a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

During a cellular handover, a connected UE (e.g., having voice and/or data connected session) switches from a source cell (base station) to a target cell (base station). An Intra-New Radio (intra-NR) handover in 3GPP may include the following three separate stages (phases), a handover preparation stage, a handover execution stage, and a handover completion stage. The preparation and execution phases of an intra-NR handover procedure may be performed without the 5GC getting involved in the process. That is, the preparation and execution messages may be directly exchanged between the base stations (e.g., the source and target gNBs) and without being sent to the 5GC. As discussed above, a gNB is a node that performs the NR user plane and control plane protocol terminations to the UE, and that is also connected, for example, via an NG interface, to the 5GC. The release of resources at a source gNB during a handover completion phase may be triggered by the target gNB.

FIG. 1 is a diagram 100 illustrating an intra-NR handover scenario in which the Access and Mobility Management Function (AMF) and User Plane Function (UPF) do not change, according to an example implementation of the present application. As shown in FIG. 1, the diagram 100 may include a UE 110, a source base station 112, a target base station 114, an AMF 116, and a UPF 118, which exchange data (e.g., messages, signaling, etc.) with each other, and with other network entities, at different points of time during a handover preparation phase 120, a handover execution phase 122, and a handover completion phase 124.

The user data is being exchanged between the UE 110 and the source base station 112 in action 126, and also between the source base station 112 and the core network (e.g., UPF 118) in action 128. Action 130 shows that the mobility control information is provided by the AMF 116. The UE context within the source base station 112 may contain information regarding the roaming and access restrictions of the UE 110, which may be provided either at the connection establishment or at the last tracking area (TA) update. In action 132, the source base station 112 may configure the UE 110 with the measurement procedures. The UE 110 may then report (e.g., the measurement values) to the source base station 112 using the measurement configuration. In action 134, based on the measurement report received from the UE 110, and other information (e.g., Radio Resource Management (RRM) information), the source base station 112 may decide to hand the UE 110 over to a target base station.

After making the decision for a handover procedure, in action 136, the source base station 112 may issue a handover request message to the target base station 114 using a transparent Radio Resource Control (RRC) container with necessary information to prepare the handover at the target side. The information may include, at least, the target base station 114 ID, the security key to use for reestablishment (KgNB* or key-gNodeB-Star), the Cell-Radio Network Temporary Identifier (C-RNTI) of the UE in the source gNB, the RRM-configuration including UE inactive time, basic AS-configuration including antenna Information and DL (Down Link) Carrier Frequency, the current Quality of Service (QoS) flow to the DRB mapping applied to the UE, the minimum system information from the source gNB, the UE capabilities for the different Radio Access Technologies (RATs), and the UE reported measurement information including the beam-related information (if available). After receiving the handover request, in action 138, the target base station 114 may perform an admission control procedure. The target base station 114 may then prepare the handover with Layer 1 (L1)/Layer 2 (L2) and send, in action 140, a handover request acknowledgement to the source base station 112. The handover request acknowledgement message may include a transparent container to be sent to the UE 110, as an RRC message to perform the handover.

In action 142, the source base station 112 may trigger a Uu handover and send a handover command message to the UE 110. The handover command message may carry the information required to access the target base station 114, which may include, at least, the target base station ID, the new C-RNTI, the target gNB security algorithm identifiers for the selected security algorithms, a set of dedicated Random Access Channel (RACH) resources, the association between the RACH resources and Synchronization Signal (SS) blocks, the association between RACH resources and UE-specific Channel State Information-Reference Signal (CSI-RS) configuration(s), common RACH resources, and target base station System Information Blocks (SIBs), etc.

The source base station 112 may send the Sequence Number Status Transfer (SN STATUS TRANSFER) message to the target base station 114 in action 144. The purpose of sending the SN Status Transfer message is to transfer the uplink Packet Data Convergence Protocol-Sequence Number (PDCP-SN) and Hyper Frame Number (HFN) receiver status, and the downlink PDCP-SN and HFN transmitter status, from the source base station 112 to the target base station 114. At the same time, in action 146, the UE 110 may detach from the source base station 112 and start synchronizing with the target base station 114. In action 148, the source base station 112 may transmit the buffered and in-transit user data to the target base station 114. In action 150, the target base station 114 may start buffering the user data received from the source base station 112.

The UE 110 may synchronize with the target base station 114 and complete the RRC handover procedure in action 152. The user data, at this point, may start to be exchanged between the UE 110 and the target base station 114, as shown in action 154, and from the target base station 114 to the UPF 118, as shown in action 156. It should be noted that in all of the data exchanges up to this point (e.g., during the handover preparation and handover execution phases), only the UE 110 and the source base station 112 and target base station 114 were involved. In other words, none of the core network elements (e.g., the AMF116 or the UPF 118) has participated in the handover preparation phase 120 and the handover execution phase 122.

In the handover completion phase 124, however, the target base station 114 may send, in action 158, a Path Switch Request message to the AMF 116 to trigger the 5GC to switch the DL data path towards the target base station 114, and to establish an NG-C interface instance for communication with the target base station 114. The NG-C interface is a control plane interface that is established between the NG-RAN and the 5GC. In action 160, the 5GC may switch the DL data path to the target base station 114 and the UPF may send one or more end marker packets, in action 162, on the old path to the source base station per PDU session/tunnel and may then release any U-plane/Transport Network Layer (TNL) resources towards the source gNB. After that, in action 166, a two-way user data communication between the target base station 114 (the new source base station) and the 5GC will be established. Next, in action 168, the AMF confirms the path switch request received from the target base station 114 by sending a Path Switch Request Acknowledgement message to the target base station 114 (the new source base station). In action 170, the old target base station 114 may send a UE Context Release message to inform the old source base station 112 about the success in the handover procedure, and trigger the release of resources by the old source base station 112. The target gNB may send this message after the Path Switch Request Acknowledgement message is received from the AMF 116. Upon receiving the UE context release message, the old source base station 112 may release the radio and C-plane related resources associated with the UE context. Any ongoing data forwarding may continue.

The concept of Multiple-Radio Dual Connectivity (MR-DC) in NR allows a multiple Rx/Tx UE to utilize the resources provided by two different nodes connected via a non-ideal backhaul. One of the nodes may provide E-UTRA access and the other one may provide NR access. Also, in NR-DC, a multiple Rx/Tx UE may be configured to utilize resources provided by two different nodes connected via a non-ideal backhaul, while both of the nodes may provide NR access. Furthermore, in an MR-DC, or an NR-DC, a Master Node (MN) may initiate a Secondary Node (SN) addition procedure and establish a UE context at the SN to provide radio resources from the SN to the UE. For bearers requiring Secondary Cell Group (SCG) radio resources, the SN addition procedure may be used to add at least the initial SCG serving cell of the SCG. The SN addition procedure may also be used to configure an SN terminated MCG bearer (e.g., in which case no SCG configuration is needed).

Figure 2:
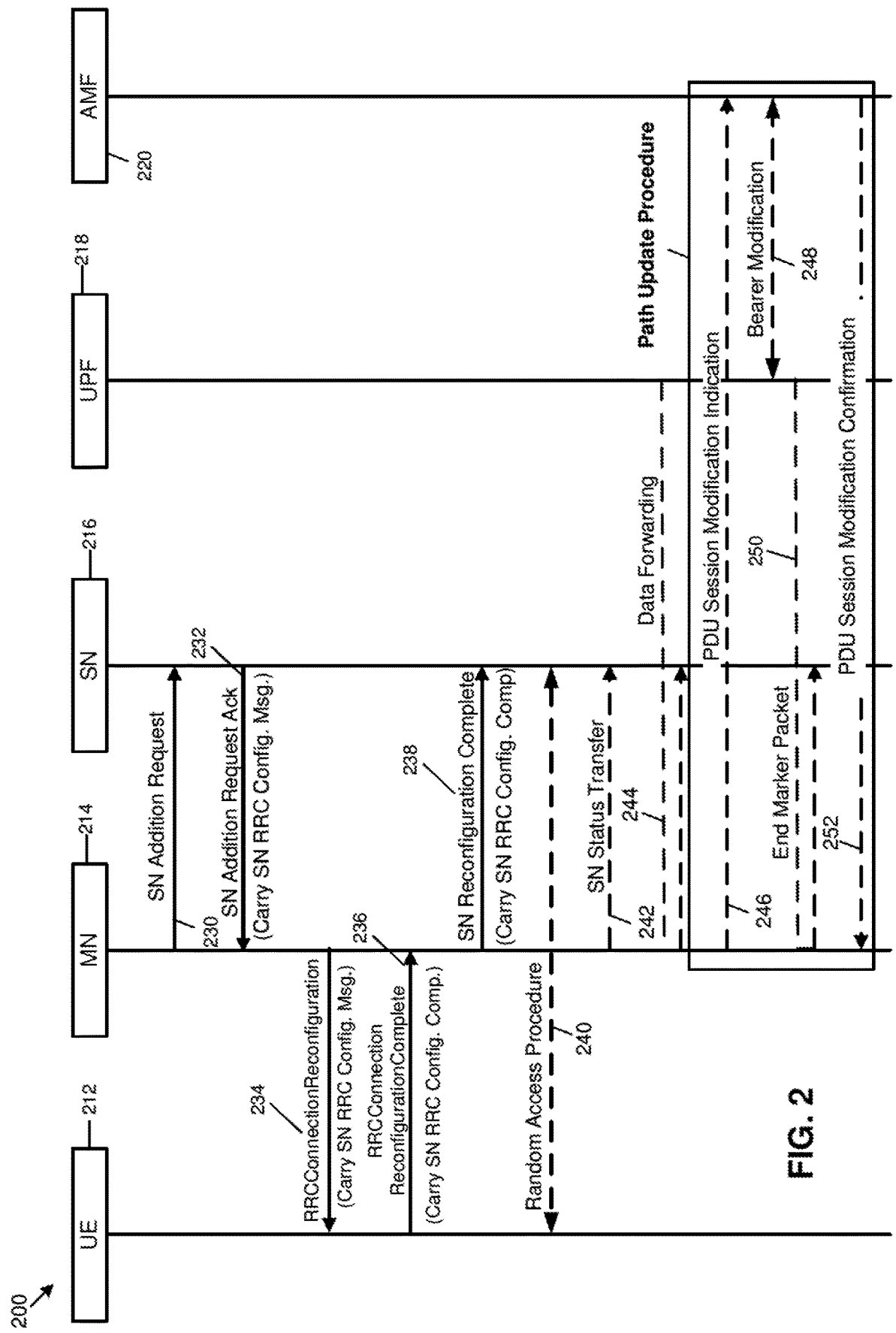
FIG. 2 is a diagram illustrating a Secondary Node (SN) addition procedure in NR, according to an example implementation of the present application.

FIG. 2 is a diagram 200 illustrating a Secondary Node (SN) addition procedure in NR, according to an example implementation of the present application. The diagram 200 may include a UE 212, an MN 214, an SN 216, a UPF 218, and an AMF 220. In action 230 the MN 214 may send a request to the SN 216 to allocate radio resources for one or more specific Protocol Data Unit (PDU) sessions/QoS flows that indicate QoS flows' characteristics (QoS Flow Level QoS parameters, PDU session level, Transport Network Layer (TNL) address information, and PDU session level Network Slice information). In addition, for bearers requiring SCG radio resources, the MN 214 may indicate the requested SCG configuration information, including the entire UE capabilities and the UE capability coordination result. The MN 214 may also provide the latest measurement results to the SN 216 in order for the SN 216 to choose and configure the SCG cell(s). The MN 214 may request the SN 216 to allocate radio resources for the split Signaling Radio Bearer (SRB) operation. The MN 214 may always provide all the security information needed for the SN 216 (even if no SN terminated bearers are setup yet) to enable an SRB3 to be set up based on the SN 216 decision. For the bearer options that require Xn-U resources between the MN 214 and the SN 216, the MN 214 may provide the Xn-U TNL address information, the Xn-U DL TNL address information for the SN terminated bearers, and the Xn-U UL TNL address information for the MN terminated bearers. The SN 216 may reject such a request.

It should be noted that for the split bearers, the requested amount of MCG and SCG resources may be enough to guarantee the QoS for the respective QoS flow (e.g., the exact sum of resources provided by the MCG and the SCG together, or even more). For the MN terminated split bearers, the MN 214 decision may be reflected in action 230 by the QoS flow parameters signaled to the SN 216, which may differ from the QoS flow parameters received over the next generation (NG) network. It should also be noted that for a specific QoS flow, the MN 214 may request a direct establishment of SCG and/or split bearers (e.g., without having to establish the MCG bearers first). Additionally, all of the QoS flows may be mapped to the SN terminated bearers. That is, there may be no QoS flow mapped to an MN terminated bearer.

If the RRM entity in the SN 216 is able to admit the resource request, it allocates respective radio resources and, depending on the bearer type options, respective transport network resources. For bearers requiring SCG radio resources, the SN 216 may trigger the UE 212 Random Access so that synchronization of the SN 216 radio resource configuration may be performed. The SN 216 may determine the PScell and other SCG Scells and provide the new SCG radio resource configuration to the MN 214 in an SN RRC configuration message contained in the SN Addition Request Acknowledge message in action 232. In case of bearer options that require the Xn-U resources between the MN 214 and the SN 216, the SN 216 may provide the Xn-U TNL address information for the respective E-RAB, the Xn-U UL TNL address information for the SN terminated bearers, and the Xn-U DL TNL address information for the MN terminated bearers. For SN terminated bearers, the SN 216 may provide the NG-U DL TNL address information for the respective PDU Session and security algorithm. If the SCG radio resources have been requested, the SCG radio resource configuration may also be provided. In case of MN terminated bearers, transmission of the user plane data may take place after action 232. Additionally, in case of SN terminated bearers, data forwarding and the SN Status Transfer may also take place after action 232.

After receiving the SN Addition Request Acknowledge message from the SN 216, in action 234, the MN 214 may send the MN RRC reconfiguration message to the UE 212. The MN RRC configuration message may include the SN RRC configuration message itself (e.g., without any modification in the SN RRC configuration message). In action 236, after applying the new configuration receive from the MN 214, the UE 212 may reply to the MN 214 with an MN RRC reconfiguration complete message which may include an SN RRC response message for the SN 216 (if needed). If the UE 212 is unable to comply with (part of) the configuration included in the MN RRC reconfiguration message, the UE 212 may perform a reconfiguration failure procedure.

In action 238, the MN 214 may inform the SN 216, via an SN Reconfiguration Complete message, that the UE 212 has completed the reconfiguration procedure successfully. The SN Reconfiguration Complete message may include the encoded SN RRC response message, (if it was received from the UE 212). In action 240, if the UE 212 is configured with bearers requiring SCG radio resources, the UE 212 may perform synchronization towards the PSCell configured by the SN 216. The order the UE may send the MN RRC reconfiguration complete message and perform the Random Access (RA) procedure towards the SCG may not be defined. A successful RA procedure towards the SCG is not required for a successful completion of the RRC Connection Reconfiguration procedure. PSCell, at this point, is the primary cell of the SCG. In action 242, the MN 214 may send a status transfer message to the SN 216. In action 244, the data may be forwarded to the SN 216. In case of SN terminated bearers, and depending on the bearer characteristics of the respective QoS Flows, the MN 214 may take actions to minimize service interruption due to the activation of the MR-DC (e.g., Data forwarding, SN Status Transfer). In action 246, the MN 214 may send a PDU Session Modification Indication message to the AMF 220. In response, the AMF 220 may send a Bearer Modification message, in action 248, to the UPF 218, which in turn, in action 250, may send an end marker packet to the MN 214 to let the MN know about the last packet delivered packet. In action 252, the AMF 220 may also send a PDU session modification confirmation to the MN 214. For the SN terminated bearers, the update of the UP path towards the 5GC may be performed via the PDU Session Path Update procedure.

An SN modification procedure may be initiated either by an MN or by an SN, and be used to modify, establish, or release PDU session/QoS Flow contexts, and to transfer the PDU session/QoS Flow contexts to/from the SN, or to modify other properties of the UE context within the same SN. The SN modification procedure may also be used to transfer an NR RRC message from the SN to the UE via the MN, and to receive a response from the UE via MN by the SN (e.g. when the SRB3 is not used). The SN modification procedure may not necessarily be involved in signaling towards the UE. The MN uses the procedure to initiate configuration changes of the SCG within the same SN, including addition, modification, or release of PDU session/

QoS Flows mapped on the SN terminated bearer(s) and MN terminated bearers with an SCG Radio Link Control (RLC) bearer. The MN may use the procedure to query the current SCG configuration, for example, when a delta configuration is applied in an MN initiated SN changes. The MN, however, may not use the procedure to initiate the addition, modification or release of the SCG SCells. The SN may reject the request, except if the request concerns the release of PDU session/QoS flow.

Figure 3:
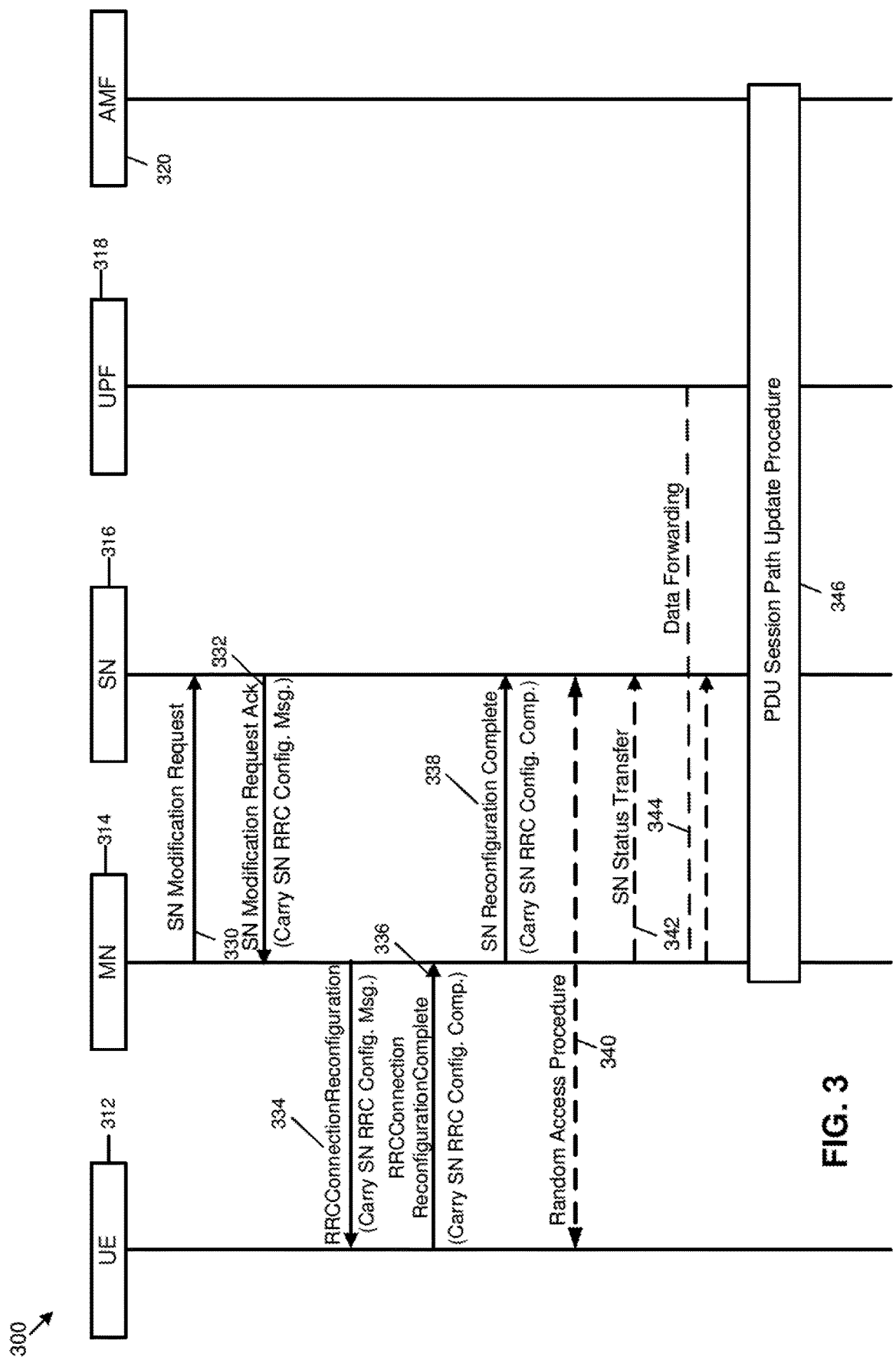
FIG. 3 is a diagram illustrating an example signaling flow for an SN modification procedure initiated by a master node (MN), in one example implementation of the present application.

FIG. 3 is a diagram 300 illustrating an example signaling flow for an SN modification procedure initiated by an MN, in one example implementation of the present application. Similar to FIG. 2, the diagram 300 of FIG. 3 may also include a UE 312, an MN 314, an SN 316, a UPF 318, and an AMF 320. In action 330, the MN 314 may send an SN modification request message, which may contain PDU session/QoS Flow context related (or other UE 312 context related information), data forwarding address information (if applicable), PDU session level Network Slice information, and the requested SCG configuration information (e.g., the UE capabilities coordination result) to the SN 316 to be used as the basis for reconfiguring the SN 316. In action 332, the SN 316 may respond with an SN Modification Request Acknowledge message, which may contain new SCG radio configuration information within an SN RRC configuration message, and data forwarding address information (if applicable).

In action 334, the MN 314 may initiate an RRC connection reconfiguration procedure, by sending an RRC configuration message to the UE 312 which may include an SN RRC configuration message. The UE 312 may apply the new configuration received from the MN 314 and reply to the MN 314 by sending, in action 336, an MN RRC reconfiguration complete message to the MN 314. The message may include an SN RRC response message (if needed). If the UE 312 is unable to comply with (part of) the configuration included in the MN RRC reconfiguration message, the UE 312 may perform a reconfiguration failure procedure. In action 338, upon successful completion of the reconfiguration, the MN 314 may indicate the success of the procedure by sending an SN reconfiguration complete message to the SN 316. In action 340, if instructed, the UE 312 may perform synchronisation with the PSCell of the SN 316, as described above in connection with the SN addition procedure. Otherwise, the UE 312 may perform a UL transmission after having applied the new configuration. In action 342, the MN 314 may send a status transfer message to the SN 316. In action 344, the data may be forwarded to the SN 316. That is, if applicable, data forwarding between the MN 314 and the SN 316 may take place (e.g., in the illustrated figure, a PDU session/QoS Flow context is transferred from the MN 314 to the SN 316). In action 346, if applicable, a PDU Session path update procedure may be performed.

In MR-DC (at least in E-UTRA-NR DC and/or NG E-UTRA-NR DC), a direct SRB (e.g., an SRB3) between an SN and a UE is supported. The decision to establish SRB3 may be made by the SN, which may provide the SRB3 configuration using an SN RRC message. The SRB3 establishment and release may be done at an SN Addition and/or modification procedure. An SRB3 reconfiguration may be done at an SN Modification procedure. The SRB3 may be used to send the SN RRC reconfiguration, SN RRC reconfiguration complete, and SN Measurement Report messages, only in procedures where the MN is not involved. The SN RRC reconfiguration complete messages are mapped to the same SRB, as the message initiating the procedure. The SN Measurement Report messages are mapped to the SRB3 (if configured), regardless of whether the configuration is received directly from the SN or received from the SN through the MN. No MN RRC messages are mapped to the SRB3.

In various implementations of the present application, a PCell (Primary Cell) may include an MCG cell, operating on the primary frequency, in which the UE either performs the initial connection establishment procedure or initiates the connection reestablishment procedure. In the MR-DC mode, the PCell may belong to the Master Node (MN).

In various implementations of the present application, a PSCell (Primary SCG Cell), for a dual connectivity operation, may include an SCG cell in which the UE performs random access when performing the reconfiguration with sync procedure. In MR-DC, the PSCell may belong to the Secondary Node (SN).

In various implementations of the present application, an RLC bearer configuration may include a lower layer part of the radio bearer configuration comprising the RLC and logical channel configurations.

In various implementations of the present application, a Secondary Cell, for a UE configured with CA, may include a cell providing additional radio resources on top of the Special Cell.

In various implementations of the present application, an MCG (Master Cell Group), for a UE configured with dual connectivity, may include a subset of serving cells comprising the PCell and zero or more secondary cells.

In various implementations of the present application, an SCG (Secondary Cell Group), for a UE configured with dual connectivity, may include a subset of serving cells comprising the PSCell and zero or more secondary cells.

In various implementations of the present application, a Serving Cell, for a UE in RRC_CONNECTED state not configured with CA/DC, may only include one serving cell comprising of the primary cell. For a UE in RRC_CONNECTED state configured with CA/DC, the Serving Cell may include a set of cells comprising the Special Cell(s) and all secondary cells.

In various implementations of the present application, an SpCell (Special Cell), for DC operation, may include the PCell of the MCG or the PS Cell of the SCG. Otherwise, the Special Cell may include the PCell.

In various implementations of the present application, an SRB1S may include the SCG part of MCG split SRB1 for EN-DC (E-UTRA-NR Dual Connectivity).

In various implementations of the present application, an SRB2S may include the SCG part of MCG split SRB2 for EN-DC.

In various implementations of the present application, an MCG bearer, in MR-DC, may include a radio bearer with an RLC bearer only in the MCG.

In various implementations of the present application, an MN terminated bearer, in MR-DC, may include a radio bearer for which PDCP is located in the MN.

In various implementations of the present application, an RLC bearer may include RLC and MAC logical channel configuration of a radio bearer in one cell group.

In various implementations of the present application, an SCG bearer, in MR-DC, may include a radio bearer with an RLC bearer only in the SCG.

In various implementations of the present application, an SN terminated bearer, in MR-DC, may include a radio bearer for which PDCP is located in the SN.

In various implementations of the present application, an SRB3, in EN-DC and NGEN-DC, may include a direct SRB between the SN and the UE. In EN-DC or NGEN-DC, SRB3 can be used for measurement configuration and reporting, to (re)configure MAC, RLC, physical layer and RLF timers and constants of the SCG configuration, and to reconfigure PDCP for DRBs associated with the S-KgNB or SRB3, provided that the (re)configuration does not require any MeNB involvement. SRB3 may be supported in NR-NR DC case and NE-DC (NR-E-UTRA Dual Connectivity) case.

In various implementations of the present application, a source terminated bearer, in MR-DC, may include a radio bearer for which PDCP is located in the source base station (e.g., Source gNB or Source eNB).

In various implementations of the present application, a target terminated bearer: in MR-DC, may include a radio bearer for which PDCP is located in the target base station (e.g., Target gNB or Target eNB).

In various implementations of the present application, a direct bearer, in MR-DC, may include a radio bearer with an RLC bearer only belonging to either the source base station or the target base station.

In various implementations of the present application, as split bearer, in MR-DC, may include a radio bearer with RLC bearers both in MCG and SCG.

As described above, in a 5G NR network, it is desirable to reduce the mobility interruption time (e.g., the shortest time duration during which a UE cannot exchange user plane packets with any base station during a transition) to as close to as, if not, zero millisecond. Some of the present implementations provide a method for a handover procedure that may include minimum mobility interruption (as close as, if not, 0 ms mobility interruption). The method, in some aspects of the present implementations, may add a target BS/cell as a new SN and then initiate a role exchange procedure between the MN (or the source BS) and the newly added SN (or the target BS), such that the target BS/cell may become the new MN. The method may then release the source BS (which has become the SN after the role exchange procedure). Some of the present implementations may enhance the existing SN addition and/or modification procedures, as described above, such that the SN (or the target BS/cell) may know that the request for SN addition/modification is, in fact, for performing a role exchange procedure (in a DC-based handover).

To achieve the handover (HO) with minimum mobility interruption, some of the present implementations may relocate one or more Packet Data Convergence Protocol (PDCP) entities from the source BS to the target BS during the HO procedure. That is, some aspects of the present implementations may use a PDCP relocation mechanism for relocating (instead of resetting and/or reestablishing) the PDCP entities in order to simultaneously apply two different security keys for deciphering the PDCP Protocol Data Units (PDUs) received from the source base station (or the MN) and/or the target base station (or the SN). One aspect of the present implementations may report any failure in handling of the aforementioned role exchange (e.g. to the source and/or target base stations).

In some of the present implementations, the source BS may send a request message (e.g., through an RRC reconfiguration message), that may include a particular indicator, to the target BS. The particular indicator carried in the request may indicate to the target BS that a DC-based HO with minimum mobility interruption should be performed. The request message may carry an SN addition/modification request message which may include necessary information for performing the DC-based HO. Alternatively, the source BS may implicitly (e.g., without any particular indicator) indicate to the target BS (or SN) that the SN addition request is for the DC-based HO, and not for a normal SN addition which requires additional resources for the UE without any role exchange. The implicit indication may include, or not include, certain necessary information, information elements, and/or RRC container.

The source BS may receive a response message from the target BS in response to performing the DC-based HO. The response message may carry the SN RRC configuration at least to establish the SRB1 and SRB2 between the UE and the target BS. In some of the present implementations, the source BS may send a DC-based HO message (e.g., using an RRC reconfiguration message) to the UE to perform the DC-based HO procedure by applying a PDCP relocation mechanism. To perform the PDCP relocation mechanism, additional NW assistance information may be required from the network (e.g., provided by the target BS or the source BS). The NW assistance information may include the information about the PDCP SN based on which the new key for the receiver interface at the UE side (e.g., via an RRC message) may be used, or sending an end-marker PDCP control PDU to indicate (to the UE) that the last PDCP packet that uses the decipher key of the source BS has been delivered.

After completion of the HO (e.g., the DC-based HO), the source base station may release the UE context based on a command received from the target base station. In case the DC-based HO procedure fails, the UE may trigger a reestablishment procedure in some aspects of the present implementations. In other aspects of the present implementations, the UE may send a target BS failure report to the source BS instead of, or in conjunction with, triggering the reestablishment procedure.

As described above, upon receiving a particular reconfiguration message (e.g., via RRC signaling from the source cell) that indicates a DC-based role exchange procedure, the UE may perform a PDCP relocation procedure in some of the present implementations. The PDCP relocation procedure may be performed based on the bearer type change cases for each radio bearer in some of the present implementations. Alternatively, the UE may perform the PDCP relocation mechanism based on the bearer type change cases for each radio bearer and the received configuration without an explicit indicator received from the base station. Upon the completion of the DC-based HO procedure (or role exchange procedure), the UE may release the configuration and/or connection to the source cell (or BS).

Figure 4:
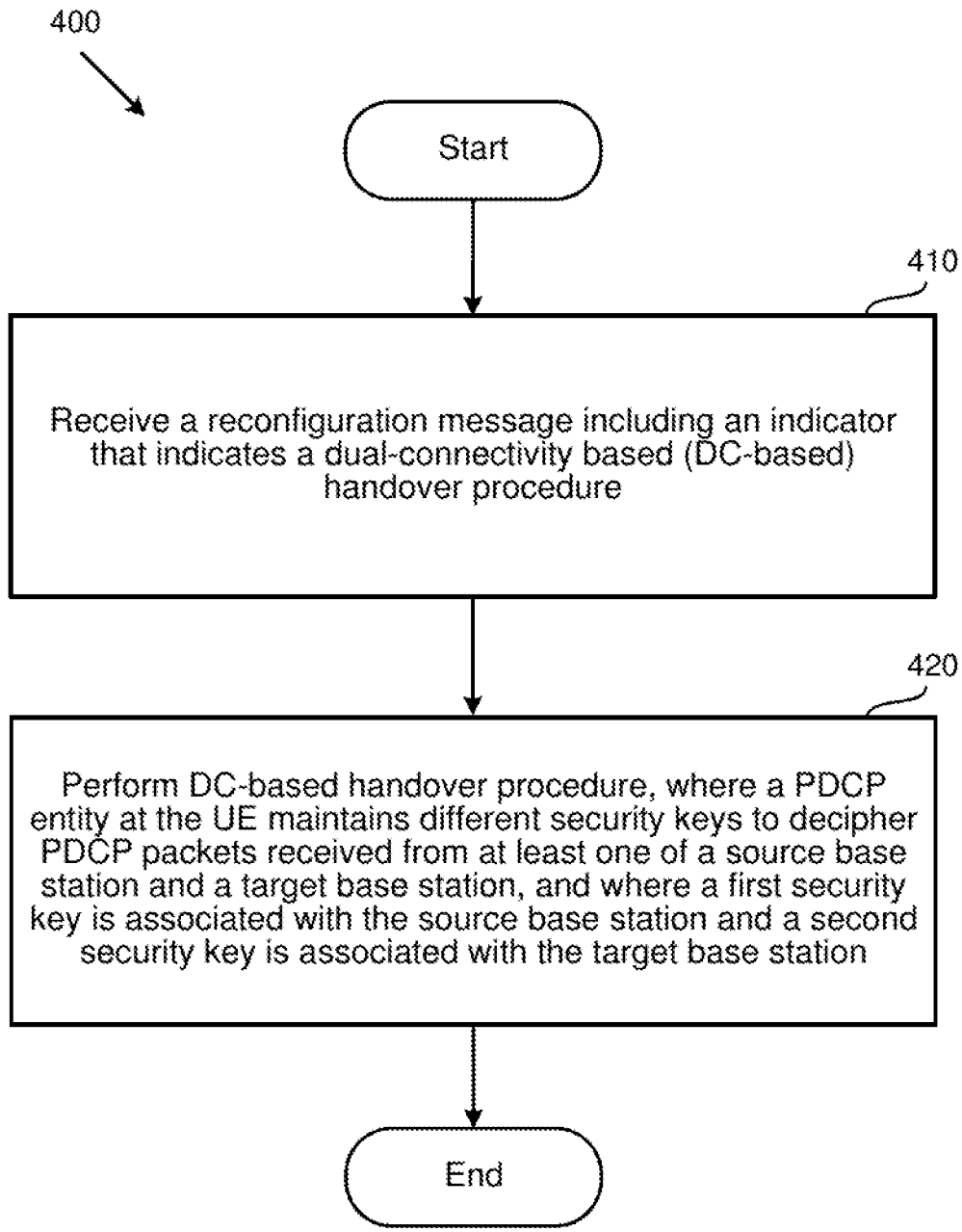
FIG. 4 is a flowchart illustrating a method (or process) performed by a user equipment (UE) for performing a handover procedure with minimum mobility interruption, according to an example implementation of the present application.

FIG. 4 is a flowchart illustrating a method (or process) 400 performed by a user equipment (UE) for performing a handover procedure with minimum mobility interruption, according to an example implementation of the present application. The process 400, in some of the present implementations, may start, at action 410, by receiving (e.g., from a source base station) a reconfiguration message that may include an indicator indicating a dual-connectivity based (DC-based) handover procedure should be performed. In one aspect of the present implementations, before receiving the reconfiguration message with the indicator in action 410, the process 400 may send a message (e.g., to the source base station, or the target base station, or another base station) that may indicate the UE's capability for performing the DC-based handover procedure.

In action 420, the process 400 may perform the DC-based handover procedure after receiving the reconfiguration message with an indicator, as described above. In order to perform the DC-based handover procedure, in some of the present implementations, a packet data convergence protocol (PDCP) entity at the UE side may maintain different security keys for deciphering different PDCP packets received from at least one of a source base station and a target base station while the UE is switching from the source base station to the target base station (e.g., during the transition from the source base station to the target base station). The different security keys maintained by the PDCP entity at the UE side may include a first security key that is associated with the source base station and a second security key that is associated with the target base station in some of the present implementations. The PDCP entity with two security keys may be configured, in some of the present implementations, to release the first key after the HO procedure is complete or may autonomously release the first security key when there is no more PDCP packet received from the source base station.

In some of the present implementations, the process 400 may decipher the PDCP packets received from the source and target base stations by applying the first security key to the PDCP packets that are received from the source base station, and applying the second security key to the PDCP packets that are received from the target base station. In some aspects of the present implementations, the process 400 may, in addition to applying the first and second security keys to the PDCP packets received from the source and/or target base stations, use additional network (NW) assistance information (e.g., that is received from the source base station) in order to determine which security key to use decipher a PDCP packet. The NW assistance information, in some of the present implementations, may include an end-marker PDCP control packet data unit (PDU) received from the source base station. The end-marker may indicate to the UE that the last PDCP packet that should be deciphered by the first security key has been delivered.

In some of the present implementations, after receiving the reconfiguration message (e.g., in action 410), the process 400 may add the target base station as a secondary node (SN) for the source base station, which is acting as a master node (MN). In some implementations, the target base station is added as the secondary node during the time the UE is transitioning from the source base station to the target base station and then becomes a new MN.

In some of the present implementations, if the UE is not in a DC mode before receiving the reconfiguration message (at action 410), the process 400 may cause the UE to switch to the DC mode after receiving the reconfiguration message. Thereafter, the process may add the target BS as a SN for the source BS that is acting as the MN. In some of the present implementations, however, if the UE is already in the DC mode (e.g., the source base station is the MN and the target base station is the SN), instead of adding the target BS as a new SN, the process 400 may reconfigure the target BS (or the current SN) to become a new MN, and the old MN (the source BS) may become an SN, so that the UE switches (or be handed over) from the new SN (the old source BS) to the new MN (the old target BS).

Figure 5:
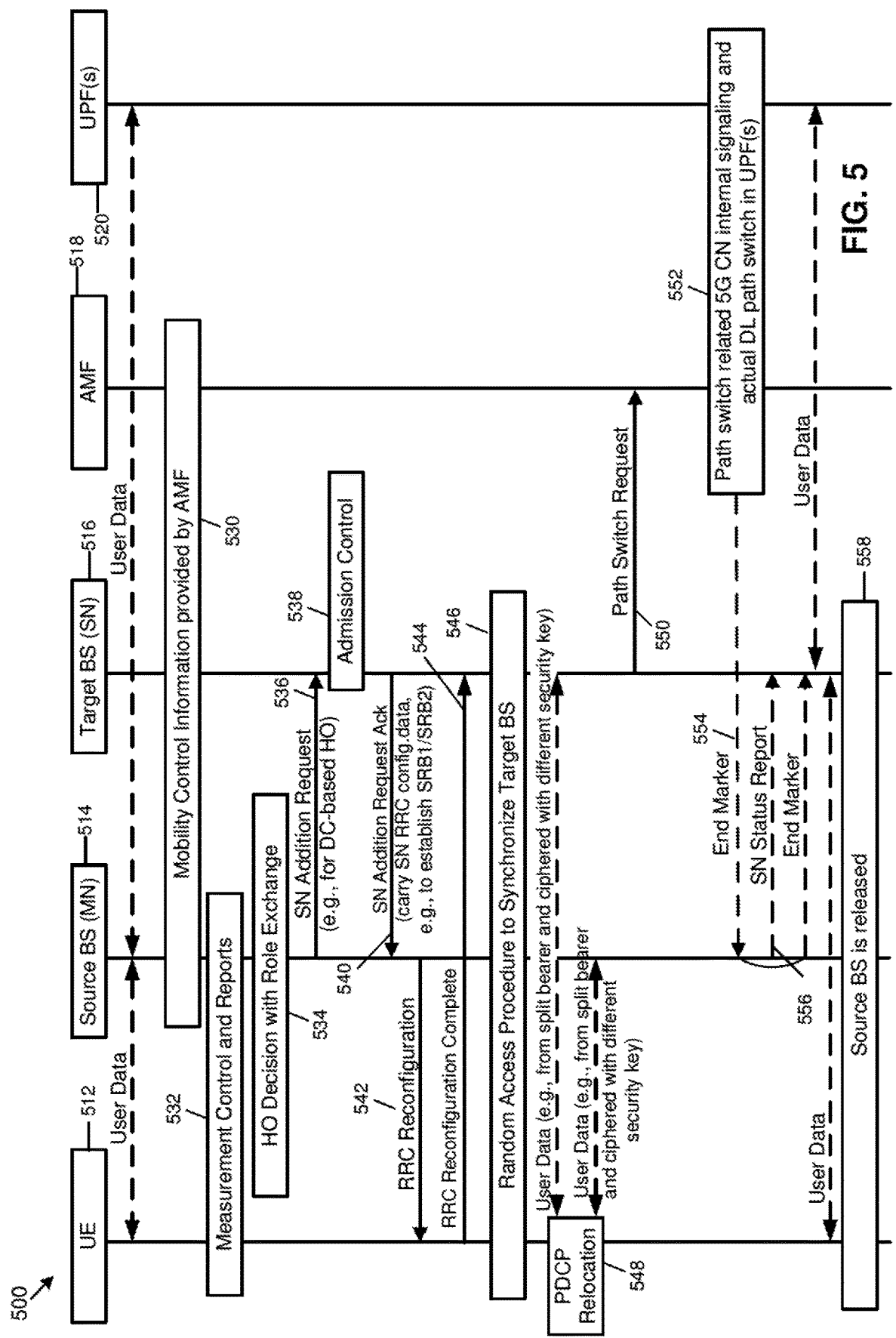
FIG. 5 is a diagram illustrating an example SN addition procedure that is for a role exchange (a dual connectivity (DC)-based handover), in one example implementation of the present application.

FIG. 5 is a diagram 500 illustrating an example SN addition procedure that is for a role exchange (a DC-based HO), in one example implementation of the present application. A UE that is in a connected state (e.g., connected to a source BS) may be configured with measurement configurations. Such a UE, in some of the present implementations, may report the measurement results to the source BS. Based on the received measurement results, the source BS may make a handover decision (e.g., a 0 ms DC-based HO that may include a role exchange). The source base station, in some of the present implementations, may send the SN addition request message with a particular indicator (indicating the purpose of DC-based HO) to a target BS to let the target BS know that the SN addition request is for an HO and not for a normal SN addition that may require additional resources for the UE (without a role exchange).

The diagram 500 may include a UE 512, a source BS (or MN) 514, a target BS (or SN) 516, an AMF 518, and a UPF 520. As shown in FIG. 5, before action 530, the user data is being exchanged between the UE 512 and the source BS 514, and also between the source BS 514 and the core network (e.g., UPF 520). In action 530, the mobility control information is provided by the AMF 518. The UE context within the source BS 514 may contain information regarding the roaming and access restrictions of the UE 512, which may be provided either at the connection establishment or at the last tracking area (TA) update. In action 532, the source BS 514 may configure the UE 512 with the measurement procedures. The UE 512 may then report (e.g., the measurement values) to the source BS 514 using the measurement configuration. In action 534, based on the measurement report received from the UE 512, and other information (e.g., Radio Resource Management (RRM) information), the source BS 514 may decide to perform a DC-based HO with minimum interruption.

In some of the present implementations, in addition to, or instead of, the RRM and/or other information, the source BS may decide on preforming a DC-based HO based on the UE's capability and/or service requirement. In some aspects of the present implementations, a UE may report (e.g., by sending out one or more messages to the source BS and/or the target BS) its capability by indicating whether the UE supports a DC-based (role exchange) HO procedure. When the source BS receives such a report from the UE, the source BS may determine that the UE could be configured to connect to both the source BS and the target BS. As such, the PCell and the PSCell may be exchanged, such that the PCell may become the new PSCell and the PSCell may become the new PCell in some of the present implementations. Thereafter, the source BS may be released.

In action 536, the source BS 514 may issue an SN addition request message (or a particular handover request message that includes an SN addition request) to the target BS 516. In some of the present implementations, the SN addition request may carry a transparent RRC container with necessary information to prepare the target BS 516 for the handover. The necessary information, in some of the present implementations, may include, at least, the target cell ID, a security key to use for re-establishment (the KBS*), the Cell-Radio Network Temporary Identifier (C-RNTI) of the UE in the source BS, the RRM-configuration including the UE's inactive time, the basic AS-configuration including antenna information and DL carrier frequency, the current QoS flow to DRB mapping applied to the UE, the minimum system information from source BS, the UE capabilities for different RATs, the UE's reported measurement information including beam-related information (if available), etc.

Moreover, in some of the present implementations, the source BS (MN) 514 may send a request to the target BS (SN) 516 to allocate radio resources for PDU sessions/QoS flows (e.g., for building target terminated direct bearer or target terminated direct bearer for PDCP relocation). In some of the present implementations, the request may indicate (to the target BS 516) the QoS flows characteristics (QoS Flow Level QoS parameters, PDU session level Transport Network Layer (TNL) address information, and PDU session level Network Slice information). In some the present implementations, the source BS 514 may also inform the target BS 516 of whether a source RLC bearer of a source terminated bearer may be maintained and used (by the target BS 516) for an SN terminated split bearer. In some of the present implementations, the source BS (MN) 514 may include an indicator within the SN addition request message (or a Handover request-like message that includes the SN addition request) to indicate to the target BS (SN) 516 that the SN addition request is for a DC-based HO, and not for a normal SN addition, which may request for additional resources for the UE (without a role exchange).

In one aspect of the present implementations, the source BS 514 may indicate (to the target BS 516) that the SN addition request is for a DC-based HO (and not for a normal SN addition) implicitly. In some of the present implementations, if the target BS (SN) 516 receives the request message including, or not including, the necessary information (or information element), or a specific RRC container to prepare for the handover, the target BS (SN) 516 may consider that the request is for a DC-based HO. An example of an implicit request may be a request that includes information for reestablishment to indicate the requirement for a DC-based role exchange procedure. As another example, when the SCG configuration information IE is not included, it may indicate that the request may be for a DC-based role exchange procedure.

The target BS 516 may perform an admission control in action 538 in some of the present implementations. In action 540, if the target BS 516 is able to admit the request in action 538, the target BS 516 may send an SN Addition Request Acknowledgement message to the source BS 514. In some of the present implementations, the acknowledgement message may carry an SN RRC configuration message. The SN RRC Configuration message, in some of the present implementations, may allocate respective radio resources for the UE and may change all of the bearer types from the MN terminated bearer to the SN terminated bearer. The SN Addition Request Acknowledgement message may also contain the UE capabilities coordination result to be used as a basis for the reconfiguration by the source BS (MN) 514. If the target BS 516 receives the indicator in the SN addition request message, the SN RRC configuration message may configure the UE 512 to establish the SRB1 and SRB2 that are associated with the target BS 516. The UE 512, in some of the present implementations, however, may not establish the SRB3 (which is only allowed to convey some RRC messages that may not require the involvement of the source BS 514). Some of the present implementations may prohibit the target BS 516 from establishing the SRB3 for the UE 512 in such a case. For example, the SN RRC configuration message, in some of the present implementations, may include information (e.g., radioBearerConfig IE) used in an RRC message (e.g., RRC setup message, RRCConnectionReconfiguration message, etc.) to set up the SRB1 and/or SRB2.

Some of the present implementations may include an indicator (e.g., set by the target BS (SN) 516) in the SN RRC configuration message to indicate to the UE 512 that a DC-based role exchange procedure is performed and trigger a corresponding behavior in the UE 512 (e.g., to perform the PDCP relocation or to release the source BS 514).

In some of the present implementations, the target BS (SN) 516 may consider a request to be for a DC-based role exchange procedure if the target BS (SN) 516 receives a request message that includes, or does not include, necessary information, information element, or specific RRC container for preparing for a handover. For example, if the request includes information for reestablishment, the request may be for a DC-based role exchange procedure. As another example, if the SCG configuration assistance information IE is not included, the request may be for a DC-based role exchange procedure. In such a case, the SN RRC configuration may configure the UE 512 to establish the SRB1 and SRB2 on the target BS 516, but not to establish an SRB3. The target BS 516 may be prohibited from establishing the SRB3 for the UE 512 in such a case.

In action 542, the source BS (MN) 514 may send an MN RRC reconfiguration message to the UE 512 that may include the same SN RRC configuration message (e.g., without modifying the SN RRC configuration message). In some of the present implementations, an indicator may be included in the MN RRC reconfiguration message (e.g., set by the source BS (MN) 514) to indicate to the UE that a DC-based role exchange procedure is performed and to trigger a corresponding behavior in the UE 512 (e.g., to deal with the PDCP relocation, or to release the source BS 514). In some of the present implementations, the source BS (MN) 514 may configure the UE 512 to release the SRB1/SRB2 associated with the source BS 514.

In action 544, in some aspects of the present implementations, the UE 512 may send an RRC reconfiguration complete message directly to the target BS 516. In some other aspects of the present implementation, the UE 512 may apply the new configuration and reply to the MN 514 with an MN RRC reconfiguration complete message that may include an SN RRC response message for the target Bs (SN) 516 (if needed). In some of the present implementations, if the UE 512 is unable to comply with (part of) the configuration included in the MN RRC reconfiguration message, the UE may perform a reconfiguration failure procedure.

In action 546, the UE 512 may perform synchronization towards the PSCell configured by the target BS (SN) 516. Before the source BS 514 is released, in action 548, the UE may need to distinguish between the PDCP packets ciphered by the source BS 514 (security) key and the PDCP packets ciphered by the target BS 516 (security) key, because the PDCP entity may have not be reestablished, but relocated from the source BS (MN) 514 to the target BS (SN) 516. In action 550, the target BS 516 may send a Path Switch Request message to the AMF 518 to trigger the 5GC to switch the DL data path towards the target BS 516 and to establish an NG-C interface instance towards the target BS 516. The NG-C is the control plane interface between the NG-RAN and the 5GC. The 5GC may switch, in action 552, the DL data path towards the target BS 516. In some of the present implementations, in action 556, the source BS 514 may send an SN Status Transfer message to the target BS 516. The purpose of sending the SN Status Transfer message may be to transfer the uplink PDCP-SN and the HFN receiver status, and the downlink PDCP-SN and the HFN transmitter status, from the source BS 514 to the target BS 516.

It should be noted that the UPF 520 may send, in action 554, one or more "end marker" packets on the old path to the source BS 514 and may then release any user plane/TNL resources toward the source BS 514 in some of the present implementations. As shown in FIG. 5, at this stage, the user data may be exchanged between the UE 512 and the new MN (e.g., the target BS (old SN) 516), as well as between the new MN and the core network (e.g., the UPF 520). In action 558, in some of the present implementations, the UE 512 may release the source BS configuration and the source BS 514 may release the UE context based on the UE decision, predefined UE's behavior, or a command from the target BS 516.

Figure 6:
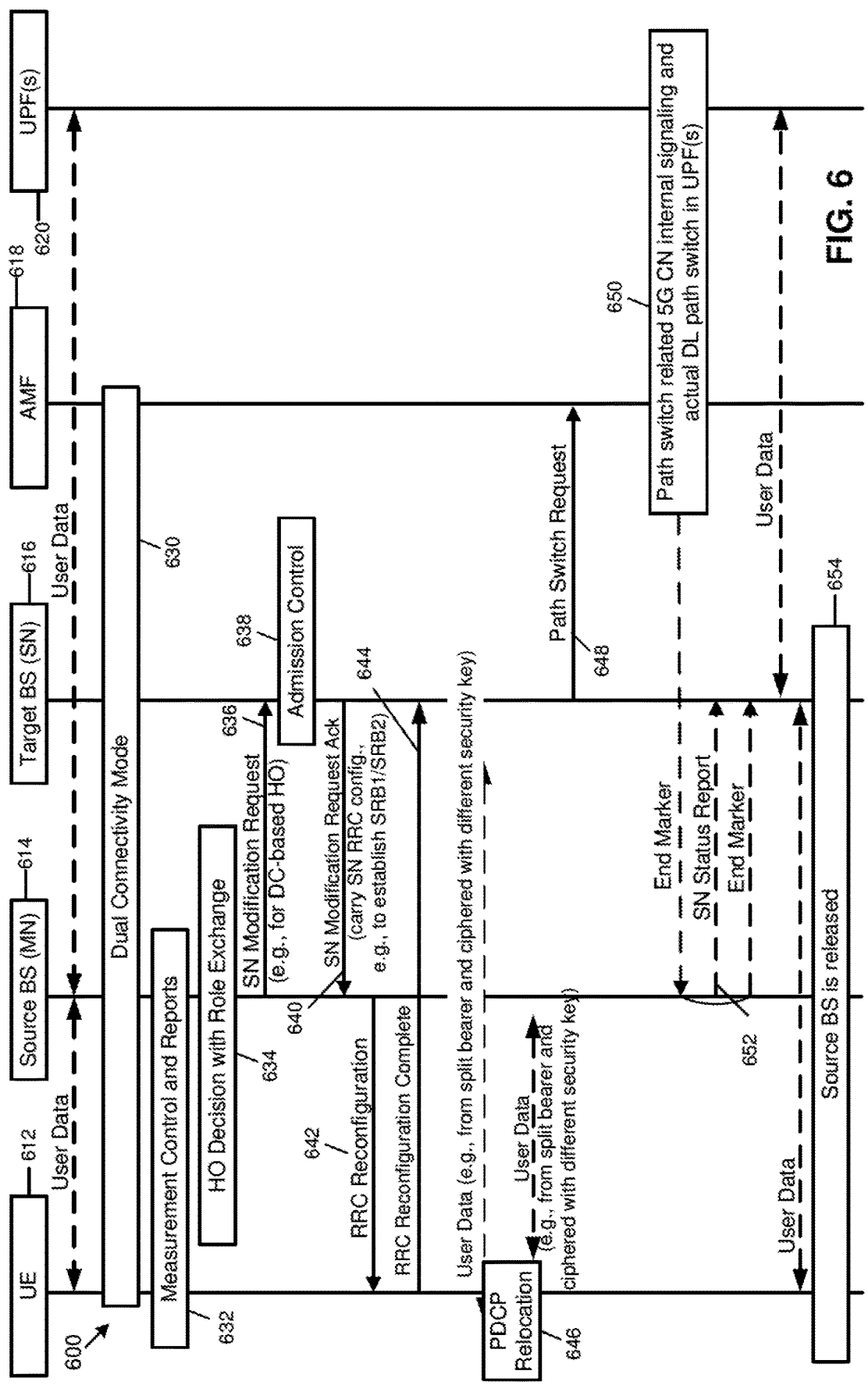
FIG. 6 is a diagram illustrating an example SN modification procedure that is for a role exchange, in one example implementation of the present application.

FIG. 6 is a diagram 600 illustrating an example SN modification procedure that is for a role exchange, in one example implementation of the present application. Some implementations may achieve the Oms interruption HO procedure by modifying an SN modification procedure. For a UE that is in a connected state (e.g., connected to a source BS), the UE may be configured with measurement configurations and may report the measurement results to the source BS. Based on the received measurement results, the source BS may make a decision to perform an HO with role exchange and send an SN modification request message with an indication for the DC-based HO to the target BS to let the target BS know that the SN modification request is for an HO, and not for a normal SN modification that asks for a new SN configuration for the UE.

The diagram 600 may include a UE 612, a source BS (or MN) 614, a target BS (or SN) 616, an AMF 618, and a UPF 620. As shown in FIG. 6, before action 630, the user data is being exchanged between the UE 612 and the source BS 614, and also between the source BS 614 and the core network (e.g., UPF 620). Before action 630, the user data may be exchanged between the UE 612 and the target BS 616, and also between the target BS 616 and the core network (e.g., UPF 620). Action 630 shows that, unlike the situation in FIG. 5, the UE 612 has entered a DC mode, for example, based on the DC configurations. In action 632, the source BS 614 may configure the UE 612 with the measurement procedures. The UE 612 may then report (e.g., the measurement values) to the source BS 614 using the measurement configuration. In action 634, based on the measurement report received from the UE 612, and other information (e.g., Radio Resource Management (RRM) information), the source BS 614 may decide to perform a DC-based HO with minimum interruption.

In action 636, the source BS 614 may issue an SN modification request message (or a handover request-like message that may include an SN modification request) to the target BS 616. The SN modification request may carry a transparent RRC container with necessary information to prepare the handover for the target BS 616. The information may include, at least, the target cell ID, KBS* (which is the security key to use for re-establishment), the C-RNTI of the UE in the source BS, the RRM-configuration including the UE inactive time, basic AS-configuration including antenna information and DL carrier frequency, the current QoS flow to DRB mapping applied to the UE, the minimum system information from source BS, the UE capabilities for different RATs, and the UE reported measurement information including beam-related information if available, etc.

Moreover, the source BS (MN) 614 may request the target BS (SN) 616 to allocate radio resources for PDU Sessions/QoS Flows (e.g., for building target terminated direct bearer or target terminated direct bearer for PDCP relocation). The request may indicate, to the target BS (SN) 616, the QoS Flows characteristics (QoS Flow Level QoS parameters, PDU session level, TNL address information, and PDU session level Network Slice information). The source BS 614 may also inform the target BS 616 of whether a source RLC bearer of a source terminated bearer could be maintained and used for an SN terminated split bearer by the target BS 616. The source BS (MN) 614 may also include an indicator within the SN modification request message (or a handover request-like message which includes the SN modification request) to indicate to the target BS (SN) 616 that the SN modification request is for a DC-based HO, and not for a normal SN modification which is asking for a new SN configuration for the UE 612 without a role exchange.

In one aspect of the present implementations, the source BS 614 may implicitly indicate to the target BS 616 that the SN modification request is for a DC-based HO (and not for a normal SN modification). In some of the present implementations, if the target BS (SN) 616 receives the request message including, or not including, the necessary information, information element, or specific RRC container for preparing for the handover, the target BS (SN) 616 may consider that the request is for a DC-based HO (e.g., to perform a DC-based role exchange procedure). For example, if the request includes information for reestablishment, the request may be for a DC-based role exchange procedure. As another example, if the SCG configuration information IE is not included, the request may be for a DC-based role exchange procedure.

The target BS 616 may perform an admission control in action 638 in some of the present implementations. If the target BS 616 is able to admit the request, the target BS 616 may send, in action 640, an SN modification request acknowledgement message to the source BS 614 which may carry an SN RRC configuration message. The SN RRC configuration message may allocate respective radio resources to the UE 612 and change all the bearer types from MN terminated bearer to SN terminated bearer.

The SN modification request acknowledgement message may also contain the UE capabilities coordination result to be used as a basis for the reconfiguration by the source BS (MN) 614. If the target BS 616 receives the indicator in the SN modification request message which indicates that this request is for a DC-based HO, the SN RRC configuration message may configure the UE 612 to establish the SRB1 and SRB2 associated with the target BS 616, and release SRB3 (if configured before). The target BS 616 may be prohibited from establishing the SRB3 for the UE 612 in such a case. For example, the SN RRC configuration message may include information (e.g., radioBearerConfig IE) used in the RRC setup message to set up the SRB1 and/or SRB2. In the SN RRC configuration message, there could be an indicator set by the target BS (SN) 616 to indicate to the UE 612 that a DC-based role exchange procedure is performed and to trigger the corresponding behavior in the UE 612 (e.g., to perform a PDCP relocation procedure, and/or to release the source BS 614).

In some of the present implementations, the target BS (SN) 616 may consider that the request is for a DC-based role exchange procedure if the target BS (SN) 616 receives the request message including, or not including, the necessary information, information element, or specific RRC container to prepare for the handover. For example, if the request includes information for reestablishment, the request may be for DC-based role exchange procedure in some of the present implementations. As another example, if the SCG configuration assistance information IE is not included in the request, the request may be for a DC-based role exchange procedure. In such a case, the SN RRC configuration may configure the UE 612 to establish the SRB1 and SRB2 on the target BS 616, but not establish the SRB3. The target BS 616 may be prohibited from establishing the SRB3 for the UE in such a case.

In action 642, the source BS (MN) 614 may send an MN RRC reconfiguration message to the UE 612 that may include the same SN RRC configuration message (e.g., without modifying the SN RRC configuration message). In some of the present implementations, an indicator may be included in the MN RRC reconfiguration message (e.g., set by the source BS (MN) 614) to indicate to the UE that a DC-based role exchange procedure is performed and to trigger a corresponding behavior in the UE 612 (e.g., to deal with the PDCP relocation, or to release the source BS 614). In some of the present implementations, the source BS (MN) 614 may configure the UE 612 to release the SRB1/SRB2 associated with the source BS 614.

In action 644, in some aspects of the present implementations, the UE 612 may send an RRC reconfiguration complete message directly to the target BS 616. In some other aspects of the present implementation, the UE 612 may apply the new configuration and reply to the source BS (MN) 614 with an MN RRC reconfiguration complete message that may include an SN RRC response message for the target BS (SN) 616 (if needed). In some of the present implementations, if the UE 612 is unable to comply with (part of) the configuration included in the MN RRC reconfiguration message, the UE may perform a reconfiguration failure procedure.

Before the source BS 614 is released, in action 646, the UE may need to distinguish between the PDCP packets ciphered by the source BS 614 (security) key and the PDCP packets ciphered by the target BS 616 (security) key, because the PDCP entity may have not been reestablished, but relocated from the source BS (MN) 614 to the target BS (SN) 616. In action 648, the target BS 616 may send a Path Switch Request message to the AMF 618 to trigger the 5GC to switch the DL data path towards the target BS 616 and to establish an NG-C interface instance towards the target BS 616. The NG-C is the control plane interface between the NG-RAN and the 5GC. The 5GC may switch, in action 650, the DL data path towards the target BS 616. In some of the present implementations, in action 652, the source BS 614 may send an SN Status Transfer message to the target BS 616. The purpose of sending the SN Status Transfer message may be to transfer the uplink PDCP-SN and the HFN receiver status, and the downlink PDCP-SN and the HFN transmitter status, from the source BS 614 to the target BS 616.

It should be noted that the UPF 620 may send one or more "end marker" packets on the old path to the source BS 614 and may then release any user plane/TNL resources toward the source BS 614 in some of the present implementations. As shown in FIG. 6, at this stage, the user data may be exchanged between the UE 612 and the new MN (e.g., the target BS (old SN) 616), as well as between the new MN and the core network (e.g., the UPF 620). In action 654, in some of the present implementations, the UE 612 may release the source BS configuration and the source BS 614 may release the UE context based on the UE 612's decision, predefined UE's behavior, or a command from the target BS 616.

In some of the present implementations, the source BS 614 may receive a source BS failure report (or an MCG failure report via the split SRB). After receiving this failure report message, the source BS 614 may trigger an MN initiated SN modification procedure with role exchange in some of the present implementations. In some of the present implementations, the source BS 614 may receive an HO request message or an HO assistance information from the target BS 616. Based on the received HO request message (or HO assistance information), the source BS 614 may trigger an MN initiated SN modification procedure with role exchange. The HO assistance information may be related to the source BS failure report (or the MCG failure report) which is sent from the UE 612 to the target BS 616. In some of the present implementations, the source BS may receive an HO request message (or HO assistance information) from the UE 612. Based on the receives HO request message (or HO assistance information), the source BS 614 may trigger an MN initiated SN modification procedure with role exchange.

To achieve a handover with minimum mobility interruption time in some of the present implementations, a source BS may request a target BS to provide resources for source/target terminated split bearer(s) and/or for target terminated bearer(s) to perform a PDCP relocation procedure (instead of the PDCP entity reestablishment). Therefore, after receiving an RRC reconfiguration message that is for a DC-based HO (or a DC-based role exchange procedure), the UE may receive PDCP packet(s) that are ciphered (or encoded) by the source BS (security) key and/or the target BS (security) key. That is, during a DC-based HO procedure, a PDCP entity (at the UE) may need to maintain two security keys, one from the source BS (MN) and the other from the target BS (SN).

Figure 7:
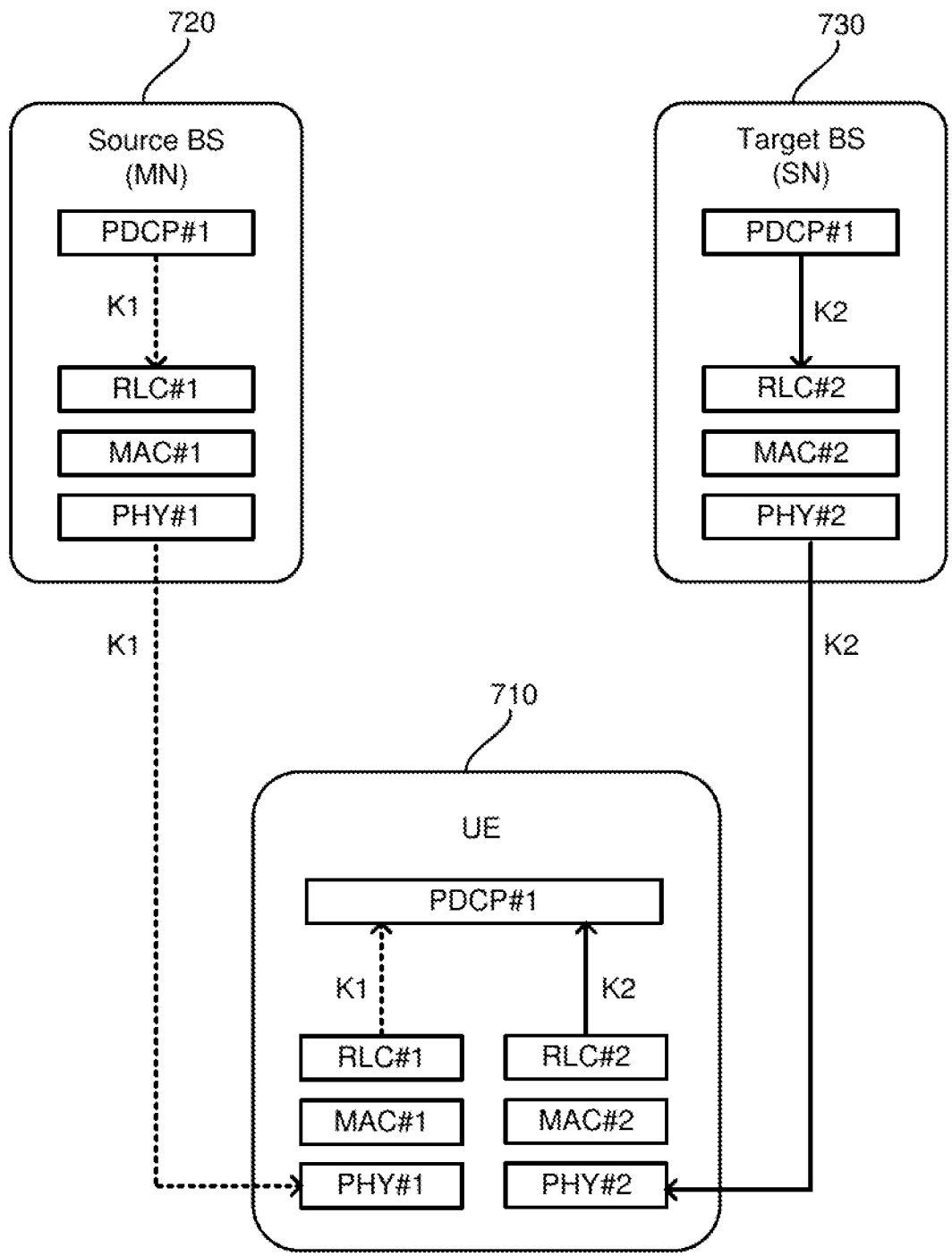
FIG. 7 illustrates an example data exchange during a handover procedure in which a UE receives data packets from both source and target base stations, in one example implementation of the present application.

FIG. 7 illustrates an example data exchange during a handover procedure in which a UE receives data packets from both source and target base stations, in one example implementation of the present application. More specifically, the figure illustrates a bearer type changing from source terminated direct bearer to target terminated direct bearer in some of the present implementations. Such a bearer type change may occur in an SN addition procedure with role exchange (as described above) since all of the bearers in the source BS are source terminated direct bearers in the beginning. Additionally, this bearer type change may also occur in an SN modification procedure with role exchange (as also described above) since certain bearer(s) in the source BS may be source terminated direct bearers. As illustrated in FIG. 7, a UE 710 may receive data packets from both source BS 720 and target BS 730. The radio stack (or protocol layers) of the source BS 720 may include a physical layer entity PHY #1, a MAC layer entity MAC #1, an RLC layer entity RLC #1, and a PDCP layer entity PDCP #1. Similarly, the radio stack of the target BS 730 may include a physical layer entity PHY #2, a MAC layer entity MAC #2, an RLC layer entity RLC #2, and a PDCP layer entity PDCP #1.

In some of the present implementations, before a DC-based handover procedure is performed, a bearer B1 may be configured as a source terminated direct bearer associated with an RLC bearer which maps to the RLC #1 and MAC #1 (e.g., based on the configuration). Then, to perform the DC-based handover procedure, the target BS may configure a new bearer B2 (which is associated with the bearer B1) as a target terminated direct bearer associated with an RLC bearer which maps to the RLC #2 and MAC #2 (e.g., based on the configuration).

If different security keys are used, the PDCP entity PDCP #1 at the UE 710 may need to know which security key is used for the received PDCP packets. For example, assuming that the security key used by the PDCP #1 at the source BS 720 is K1 and the security key used by the PDCP #1 at the target BS 730 is K2, the UE 710 may need to identify which one of the security keys K1 and K2 should be used to decipher each received PDCP packet. However, based on the fact that the UE 710 may know the patch (and the source) a PDCP packet is received from (e.g., based on which RLC entity delivers the PDCP packet), the UE may rely on its implementation to distinguish between the PDCP packets chippered by the source BS 720 security key and/or the target BS 730 security key.

It should be noted that the target BS 730 may configure the new bearer B2 (that is related to the bearer B1, as described above) as a target terminated split bearer associated with two RLC bearers (e.g., RLC #1 and RLC #2). A similar concept for "the bearer type change from a source terminated direct bearer to a target terminated direct bearer" may be adopted for "the bearer type change from a source terminated direct bearer to a target terminated split bearer" in some of the present implementations. For example, before a DC-based handover procedure is performed, a bearer B1 may be configured as a source terminated direct bearer associated with one RLC bearer, RLCB #1 (on the source BS) based on the MN configuration. Then, to perform the DC-based handover procedure, the target BS may configure a new bearer B2 (that is associated with the bearer B1) as a target terminated split bearer associated with two RLC bearers, which are RLCB #3 (on the source BS) and RLCB #4 (on the target BS), based on the MN/SN configurations. It should be noted that the RLCB #3 may be the same as the RLCB #1.

Figure 8:
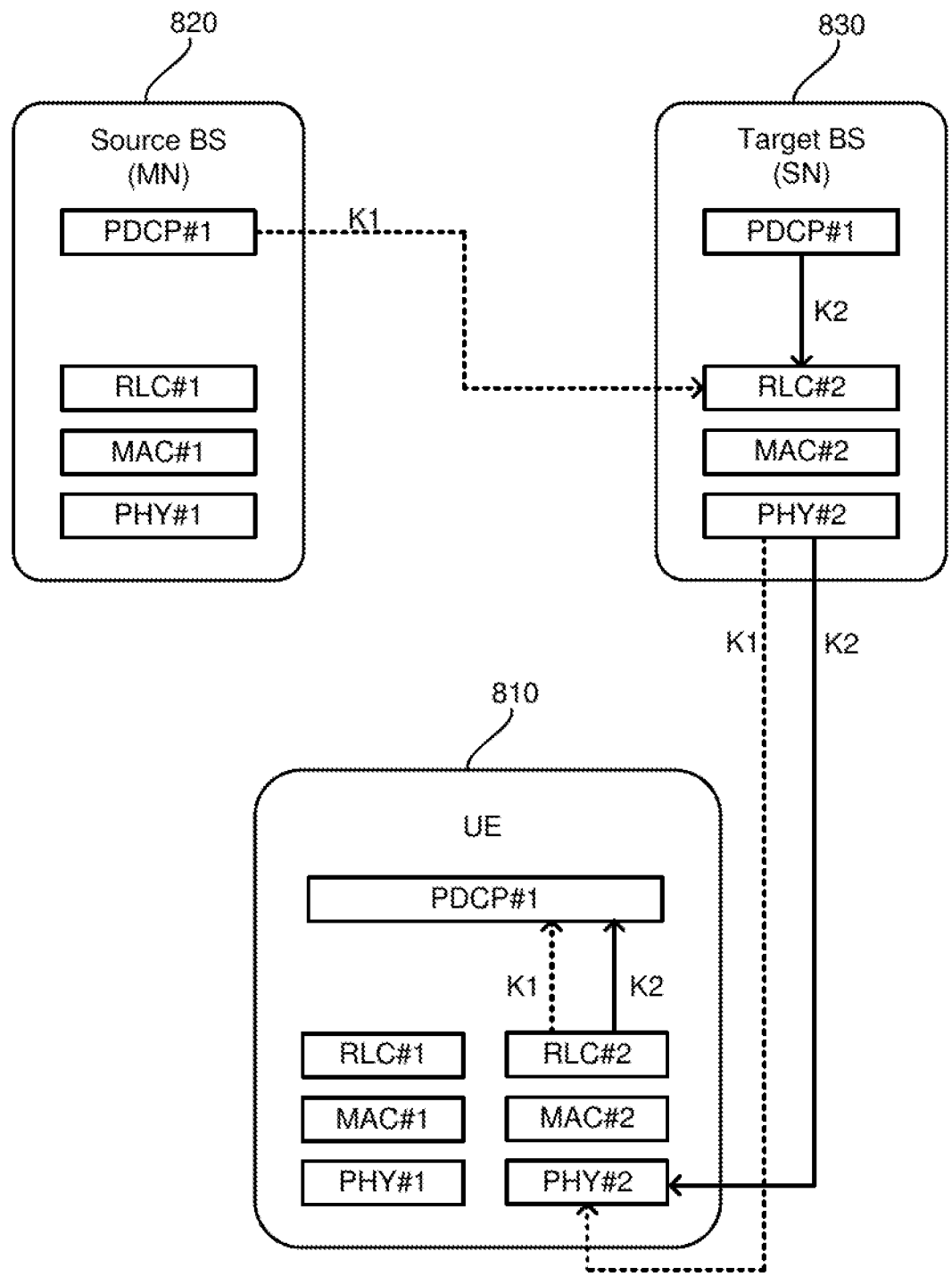
FIG. 8 illustrates another example data exchange during a handover procedure in which a UE receives data packets from a source base station and/or a target base station, in one example implementation of the present application.

FIG. 8 illustrates another example data exchange during a handover procedure in which a UE receives data packets from the source base station and/or the target base station, in one example implementation of the present application. More specifically, the figure illustrates a different bearer type changing (form the bearer type changing illustrated in FIG. 7) from source terminated direct bearer to target terminated direct bearer in some of the present implementations. Such a bearer type change may only occur in an SN modification procedure with role exchange since certain bearer(s) in source BS may be source terminated split bearers only when the UE is in a DC mode. As illustrated in FIG. 8, a UE 810 may receive data packets from both source BS 820 and target BS 830. Similar to FIG. 7, the radio stack (or protocol layers) of the source BS 820 may include a physical layer entity PHY #1, a MAC layer entity MAC #1, an RLC layer entity RLC #1, and a PDCP layer entity PDCP #1. Similarly, the radio stack of the target BS 830 may include a physical layer entity PHY #2, a MAC layer entity MAC #2, an RLC layer entity RLC #2, and a PDCP layer entity PDCP #1.

Before a DC-based handover procedure is performed, a bearer B1 may be configured as a source terminated split bearer associated with an RLC bearer which maps to the RLC #1 and MAC #1, based on the configuration. Then, to perform the DC-based handover procedure, the target BS 830 may configure a new bearer B2 (which is associated with the bearer B1) as a target terminated direct bearer associated with an RLC bearer which maps to the RLC #2 and MAC #2, based on the configuration.

If different security keys are used, the PDCP #1 entity of the UE 810 may need to know which security key is used for the received PDCP packet. For example, assuming that the security key used by the PDCP #1 entity at the source BS 820 is K1 and the security key used by the PDCP #1 entity at the target BS 830 is K2, the UE 810 may need to identify which one of the security keys K1 and K2 is used to decipher the received PDCP packets. In the scenario illustrated in FIG. 8, the UE 810 may need the NW assistance, in some of the present implementations, in order to identify which security key is used to encode a received PDCP packet. As an example for the NW assistance, in some aspects of the present implementations, a key index may be added to the PDCP PDU header of a PDCP packet to indicate which security key (e.g., from the security keys K1 and K2) may be used to decipher the PDCP packet. As another example for the NW assistance, the NW may indicate to the UE the PDCP SN from which the new key may be indicated to the receiver via an RRC connection reconfiguration message, or an end-marker PDCP control PDU in some of the present implementations.

It should be noted that the target BS may configure a new bearer B2 (which is related to the bearer B1) as a target terminated split bearer associated with two RLC bearers. A similar concept for "the bearer type change from source terminated split bearer to target terminated direct bearer" may be adopted for "the bearer type change from source terminated split bearer to target terminated split bearer" in this scenario. For example, before a DC-based handover procedure is performed, a bearer B1 may be configured as a source terminated split bearer associated with two RLC bearers, which are RLCB #1 (on the source BS 820) and RLCB #2 (on the target BS 830), based on the MN/SN configurations. Then, to perform the DC-based handover procedure, the target BS 830 may configure a new bearer B2 (that is related to the bearer B1) as a target terminated split bearer associated with two RLC bearers, for example, the RLCB #3 (on the source BS 820) and the RLCB #4 (on the target BS 830), based on the MN/SN configurations. It should be noted that the RLCB #3 may be the same as the RLCB #1, and the RLCB #4 may be the same as the RLCB #2.

In actions 548 and 646 described above with reference to FIGS. 5 and 6, respectively, since the UE may know which bearer type change is performed based on the received RRC reconfiguration message, the NW may not need to provide any additional NW assistance information (e.g., by indicating to the UE the PDCP SN from which to use the new key for the receiver via the RRC connection reconfiguration message, or sending the end-marker PDCP control PDU) to identify which security key is used for the received PDCP packets all the time. For example, in case of a source terminated direct bearer to a target terminated direct/split bearer, the UE may rely on its implementation to distinguish between the PDCP packets chippered by the source BS security key and the target BS security key without any NW assistance. Conversely, in a case of a source terminated split bearer to a target terminated direct/split bearer, the UE may need to follow NW assistance in order to distinguish between the PDCP packets received form the source BS (e.g., ciphered by the source BS security key) or from the target BS (e.g., ciphered by the target BS security key).

In some aspects of the present implementations, in order to avoid the additional requirement of NW assistance information for PDCP relocation (to identify which security key is used for a received PDCP packet), the NW is only allowed to perform the bearer type changing from source terminated direct bearer to target terminated direct bearer and/or the bearer type changing from source terminated direct bearer to target terminated split bearer. For example, to perform the SN modification procedure with role exchange, the source BS may need to first configure all the bearers as source terminated direct bearer(s) in some of the present implementations.

In some of the present implementations, in action 558 illustrated in FIG. 5, and action 654 illustrated in FIG. 6, the UE may release the configuration of the source BS autonomously and then inform the target BS of the release, for example, via RRC Signaling. The UE may autonomously release the source BS based on the UE's implementation, or when receiving a PDCP packet from the target cell of the target BS, or when detecting a Radio Link Failure (RLF) on the source BS. Upon receiving the information from the UE, the target BS may inform the source BS to release the UE context.

In some alternative implementations, in action 558 illustrated in FIG. 5, and action 654 illustrated in FIG. 6, the UE may release the source BS autonomously and may not inform the target BS. The UE may autonomously release the source BS based on its implementation, receiving a PDCP packet from a target cell of the target BS, or detecting an RLF on the source BS. On the NW side, the target BS may consider that the source BS is released by the UE based on its implementation. In some of the present implementations, in action 558 illustrated in FIG. 5, and action 654 illustrated in FIG. 6, the UE may release the source BS based on a target BS command. For example, the target BS may send an indicator to release the source BS in an RRC signaling. In one aspect of the present implementations, it may be up to the target BS implementation to decide when to release the source BS.

In some of the present implementations, in action 558 illustrated in FIG. 5, and action 654 illustrated in FIG. 6, if there is at least one RLC bearer configured on the source BS, the UE may not be able to autonomously release the source BS. In such a case, the UE may wait for the target BS command as discussed above. If there is no RLC bearer configured on the source BS, the UE may autonomously release the source BS (as described above). The UE may autonomously release the source BS based on its implementation, receiving a PDCP packet from the target cell of the target BS, or detecting an RLF on the source BS.

In some of the present implementations, in action 558 illustrated in FIG. 5, and action 654 illustrated in FIG. 6, the UE may release the source BS based on a timer set in the RRC configuration message for a DC mode HO. For example, the received RRC reconfiguration message for the DC mode HO may include a timer T1. The timer T1 may start when the UE receives an RRC reconfiguration message, which is for a DC-based HO procedure. The timer T1 may stop when the role exchange procedure fails (e.g., the SN addition procedure fails or an RRC reconfiguration failure occurs). The UE may realize that the RRC reconfiguration message is for a DC-based HO by checking whether there is an indicator included in the RRC reconfiguration message, which is used to inform the UE that this RRC reconfiguration is used for a DC-based HO. The indication may be set by an MN (e.g., in the MN configuration part) or by an SN (e.g., in the SN configuration part).

In some aspects of the present implementations, the UE may implicitly realize that the RRC reconfiguration message is for a DC-based HO. That is, the UE may determine that the RRC reconfiguration message is for a DC-based role exchange procedure if the received RRC reconfiguration message includes the necessary information (or RRC container) for a handover, as well as the information for a role exchange procedure. If the timer T1 expires, the UE may release the source BS accordingly. In one aspect of the present implementations, when the timer T1 is running, the target BS may still send a command to the UE to stop the timer T1 from running and to take control of the releasing of the source BS.

In some of the present implementations, if the SRB1/SRB2 of the source BS is maintained, to deal with a DC-based HO failure or an RRC reconfiguration failure, the UE may perform a connection reestablishment procedure. In some aspects of the present implementations, if the SRB1/SRB2 of the source BS is maintained, to deal with a DC-based HO failure or an RRC reconfiguration failure, the UE may send to the target BS a failure report (or an SCG failure report) via the SRB1 or SRB2 of the source BS to inform the source BS that the DC-based HO has failed, or the RRC reconfiguration has failed. The failure report may set the failure cause as "DC-based HO failure" in a DC-based HO failure case. The target BS failure report may set the failure cause as "RRC reconfiguration failure" in an RRC reconfiguration failure case. When receiving a target BS failure report, the source BS may suspend the HO procedure by reconfiguration or start preparing to handover the UE to another target cell, or send a command to the UE to perform a reestablishment procedure. In some other aspects of the present implementations, if the SRB1/SRB2 of the source BS is not maintained, or is released based on an MN RRC reconfiguration, the UE may then perform a connection reestablishment procedure.

Figure 9:
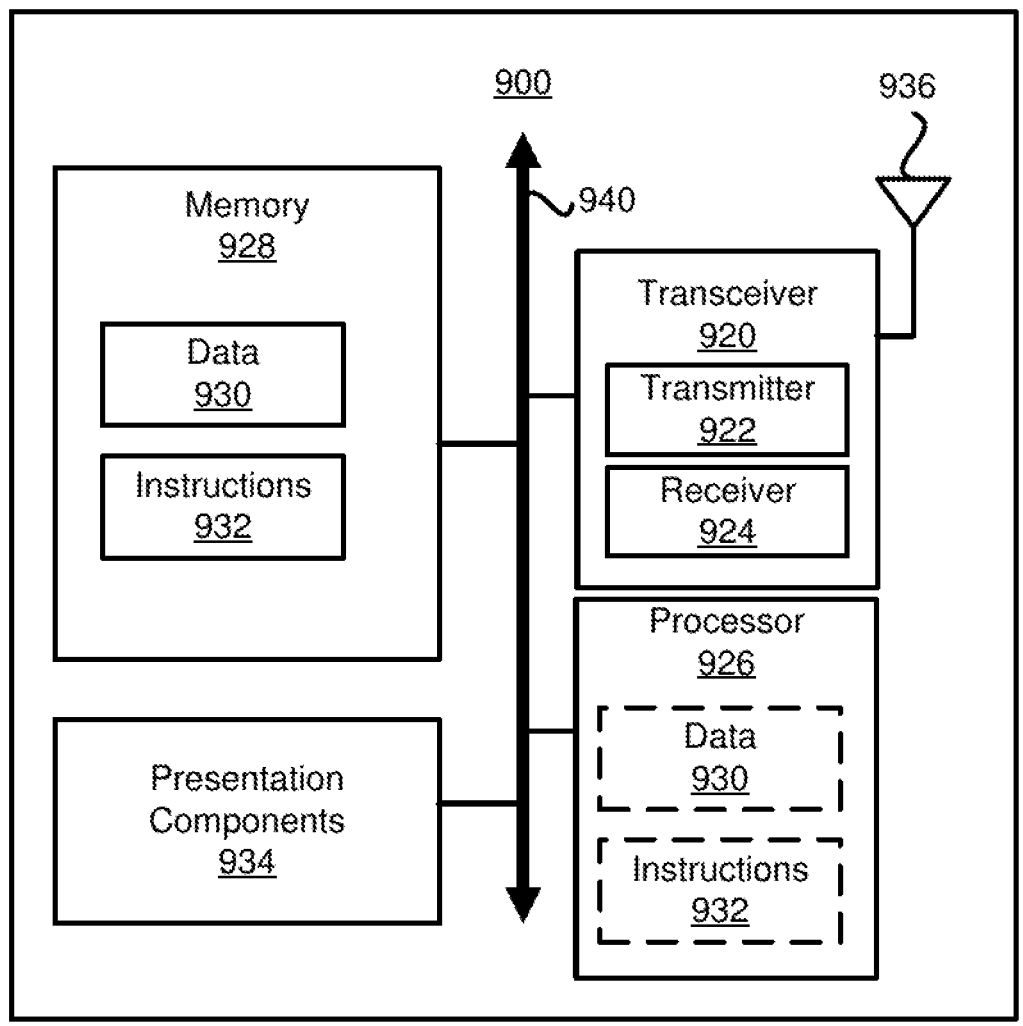
FIG. 9 illustrates a block diagram of a node for wireless communication, in accordance with various aspects of the present application.

FIG. 9 illustrates a block diagram of a node for wireless communication, in accordance with various aspects of the present application. As shown in FIG. 9, node 900 may include transceiver 920, processor 926, memory 928, one or more presentation components 934, and at least one antenna 936. Node 900 may also include a Radio Frequency (RF) spectrum band module, a base station communications module, a network communications module, and a system communications management module, input/output (I/O) ports, I/O components, and power supply (not explicitly shown in FIG. 9). Each of these components may be in communication with each other, directly or indirectly, over one or more buses 940.

Transceiver 920 having transmitter 922 and receiver 924 may be configured to transmit and/or receive time and/or frequency resource partitioning information. In some implementations, transceiver 920 may be configured to transmit in different types of subframes and slots including, but not limited to, usable, non-usable and flexibly usable subframes and slot formats. Transceiver 920 may be configured to receive data and control signalings.

Node 900 may include a variety of computer-readable media. Computer-readable media can be any available media that can be accessed by node 900 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 928 may include computer-storage media in the form of volatile and/or non-volatile memory. Memory 928 may be removable, non-removable, or a combination thereof. Exemplary memory includes solid-state memory, hard drives, optical-disc drives, and etc. As illustrated in FIG. 9, memory 928 may store computer-readable, computer-executable instructions 932 (e.g., software codes) that are configured to, when executed, cause processor 926 to perform various functions described herein, for example, with reference to FIGS. 1 through 8. Alternatively, instructions 932 may not be directly executable by processor 926 but be configured to cause node 900 (e.g., when compiled and executed) to perform various functions described herein.

Processor 926 may include an intelligent hardware device, for example, a central processing unit (CPU), a microcontroller, an ASIC, and etc. Processor 926 may include memory. Processor 926 may process data 930 and instructions 932 received from memory 928, and information through transceiver 920, the base band communications module, and/or the network communications module. Processor 926 may also process information to be sent to transceiver 920 for transmission through antenna 936, to the network communications module for transmission to a core network.

One or more presentation components 934 presents data indications to a person or other device. For example, one or more presentation components 934 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for performing a handover procedure with minimum mobility interruption, the method comprising:
    receiving, at the UE, a reconfiguration message having an indicator for performing a dual-connectivity based (DC-based) handover procedure;
    performing the DC-based handover procedure without reestablishing a packet data convergence protocol (PDCP) entity of the UE during the DC-based handover procedure, wherein the PDCP entity maintains a plurality of security keys to decipher PDCP packets received from at least one of a source base station and a target base station while the UE is transitioning from the source base station to the target base station, wherein performing the DC-based handover procedure comprises:
    applying first and second security keys to the PDCP packets received, respectively, from the source and target base stations using additional network (NW) assistance information, and
    wherein the additional NW assistance information comprises an end-marker PDCP control packet data unit (PDU), the end-marker indicating that the last PDCP packet that uses the first security key to be deciphered has been delivered.

2. The method of claim 1, wherein deciphering the PDCP packets comprises applying a first security key of the plurality of security keys maintained by the PDCP entity to a first subset of the PDCP packets that is received from the source base station and applying a second security key of the plurality of security keys to a second subset of the PDCP packets that is received from the target base station.

3. The method of claim 1, further comprising reporting a handover procedure failure to the source base station when the DC-based handover procedure is not performed successfully.

4. The method of claim 1, wherein performing the DC-based handover procedure further comprises:
    adding the target base station as a secondary node (SN) for the source base station that is acting as a master node (MN), and
    reconfiguring the SN to become a new MN.

5. The method of claim 4, further comprising transitioning to a dual connectivity mode after receiving the reconfiguration message to receive the PDCP packets from at least one of the MN and the SN.

6. The method of claim 1, wherein, before receiving the reconfiguration message, the UE is in a dual connectivity mode with the source base station acting as a master node (MN) and the target base station acting as a secondary node (SN), the method further comprising, after receiving the reconfiguration message, reconfiguring the SN to become a new MN.

7. The method of claim 1, wherein performing the DC-based handover procedure comprises relocating the PDCP entity from the source base station to the target base station instead of reestablishing the PDCP entity during the handover procedure.

8. The method of claim 1, wherein the reconfiguration message includes configuration data for configuring the UE to establish signaling radio bearer type 1 (SRB1) and SRB2 with the target base station.

9. The method of claim 1, wherein performing the DC-based handover procedure comprises performing the DC-based handover procedure based on a change of bearer type for each radio bearer.

10. The method of claim 1, further comprising, before receiving the reconfiguration message having the indicator, sending out a message that indicates the UE's capability of performing the DC-based handover procedure.

11. A user equipment (UE), comprising:
    one or more non-transitory computer-readable media having computer-executable instructions for performing a handover procedure with minimum mobility interruption embodied thereon; and
    at least one processor coupled to the one or more non-transitory computer-readable media, and configured to execute the computer-executable instructions to:
    receive, at the UE, a reconfiguration message having an indicator for performing a dual-connectivity based (DC-based) handover procedure; and
    perform the DC-based handover procedure without reestablishing a packet data convergence protocol (PDCP) entity of the UE during the DC-based handover procedure, wherein the PDCP entity maintains a plurality of security keys to decipher PDCP packets received from at least one of a source base station and a target base station while the UE is transitioning from the source base station to the target base station, wherein performing the DC-based handover procedure further comprises applying the first and second security keys to the PDCP packets received, respectively, from the source and target base stations using additional network (NW) assistance information, wherein the additional NW assistance information comprises an end-marker PDCP control packet data unit (PDU), the end-marker indicating that the last PDCP packet that uses the first security key to be deciphered has been delivered.

12. The UE of claim 11, wherein deciphering the PDCP packets comprises applying the first security key of the plurality of security keys maintained by the PDCP entity to a first subset of the PDCP packets that is received from the source base station and applying the second security key of the plurality of security keys to a second subset of the PDCP packets that is received from the target base station.

13. The UE of claim 11, wherein the at least one processer is further configured to execute the computer-executable instructions to report a handover procedure failure to the source base station when the DC-based handover procedure is not performed successfully.

14. The UE of claim 11, wherein performing the DC-based handover procedure further comprises:
   adding the target base station as a secondary node (SN) for the source base station that is acting as a master node (MN), and
   reconfigure the SN to become a new MN.

15. The UE of claim 14, wherein the at least one processor is further configured to execute the computer-executable instructions to transition to a dual connectivity mode after receiving the reconfiguration message to receive the PDCP packets from at least one of the MN and the SN.

16. The UE of claim 11, wherein, before the reconfiguration message is received, the UE is in a dual connectivity mode with the source base station acting as a master node (MN) and the target base station acting as a secondary node (SN), wherein the at least one processor is further configured to execute the computer-executable instructions to, after the reconfiguration message is received, reconfigure the SN to become a new MN.

17. The UE of claim 11, wherein the at least one processor is further configured to execute the computer-executable instructions to, before receiving the reconfiguration message having the indicator, send out a message that indicates the UE's capability of performing the DC-based handover procedure.

* * * * *